United States Patent
Okada et al.

(10) Patent No.: US 12,044,823 B2
(45) Date of Patent: Jul. 23, 2024

(54) LAYERED FILM AND LAYERED MEMBER

(71) Applicant: NIPPON PAINT AUTOMOTIVE COATINGS CO., LTD., Osaka (JP)

(72) Inventors: Takuma Okada, Hirakata (JP); Takamitsu Watanabe, Hirakata (JP); Takeki Hosokawa, Hirakata (JP); Kei Takigawa, Hirakata (JP); Kazuhito Kobayashi, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 17/629,944

(22) PCT Filed: Jul. 22, 2020

(86) PCT No.: PCT/JP2020/028548
§ 371 (c)(1),
(2) Date: Jan. 25, 2022

(87) PCT Pub. No.: WO2021/020301
PCT Pub. Date: Feb. 4, 2021

(65) Prior Publication Data
US 2022/0299681 A1    Sep. 22, 2022

(30) Foreign Application Priority Data
Jul. 26, 2019   (JP) ................... 2019-138313

(51) Int. Cl.
*G02B 1/14*    (2015.01)
*G02B 1/11*    (2015.01)

(52) U.S. Cl.
CPC . *G02B 1/14* (2015.01); *G02B 1/11* (2013.01)

(58) Field of Classification Search
CPC .................. G02B 1/111; G02B 1/14
See application file for complete search history.

(56) References Cited

U.S. PATENT DOCUMENTS

| 6,899,957 B2 * | 5/2005 | Nishida ............ G02B 1/14 428/323 |
| 2002/0127408 A1 | 9/2002 | Nishida et al. |
| 2005/0163977 A1 | 7/2005 | Miyatake et al. |
| 2008/0038472 A1 | 2/2008 | Suzuki et al. |

FOREIGN PATENT DOCUMENTS

| JP | 2001-59902 | 3/2001 | |
| JP | 2004123780 A | * 4/2004 | |
| JP | 2004-212619 | 7/2004 | |
| JP | 2006-349830 | 12/2006 | |
| JP | 2007-178999 | 7/2007 | |
| JP | 2007-283293 | 11/2007 | |
| JP | 2010-195901 | 9/2010 | |
| JP | 2015-4937 | 1/2015 | |
| JP | 2015034832 A | * 2/2015 | ........ C08G 18/4277 |
| JP | 2015-121739 | 7/2015 | |

OTHER PUBLICATIONS

Machine translation of JP 2015-034832. Retrieved Jul. 25, 2023.*
Machine translation of JP2004123780. Retrieved Feb. 3, 2024.*
International Search Report (ISR) issued Sep. 29, 2020 in International (PCT) Application No. PCT/JP2020/028548.
Japanese Office Action issued Mar. 16, 2021 in corresponding Japanese Patent Application No. 2021-500975, together with Machine English translation thereof.
International Preliminary Report on Patentability and Written Opinion of the International Searching Authority issued Feb. 1, 2022 in International (PCT) Application No. PCT/JP2020/028548.
Extended European Search Report issued Jul. 4, 2023 in corresponding European Patent Application No. 20848565.6.

* cited by examiner

*Primary Examiner* — Prashant J Khatri
(74) *Attorney, Agent, or Firm* — Wenderoth, Lind & Ponack, L.L.P.

(57) ABSTRACT

Provided is a laminated film that can be molded into a complicated shape. A laminated film comprising a transparent support substrate; an uncured hard coat layer formed on at least one surface of the transparent support substrate; and an uncured optical interference layer formed on the uncured hard coat layer, wherein the uncured hard coat layer comprises an active energy ray-curable composition for forming a hard coat layer, the uncured optical interference layer comprises an active energy ray-curable composition for forming a optical interference layer, a thickness of the transparent support substrate is 50 μm or more and 600 μm or less, a luminous reflectance including regular reflected light measured from an uncured optical interference layer side is 0.1% or more and 4.0% or less, and a stretch ratio at 160° C. is 50% or more.

10 Claims, No Drawings

LAYERED FILM AND LAYERED MEMBER

TECHNICAL FIELD

The present invention relates to a laminated film and a laminated member.

BACKGROUND ART

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. Such products are often covered with a protective material. The protective material is usually obtained by molding a film having a hard coat layer.

The protective material of a display may be further provided with a low refractive index layer for the purpose of reducing the reflectance of the viewing-side surface.

JP 2015-004937 A (Patent Document 1) teaches a laminated film in which a hard coat layer and a low refractive index layer (an optical interference layer) are sequentially laminated on a transparent support.

CITATION LIST

Patent Literature

Patent Literature 1: JP 2015-004937 A

SUMMARY OF THE INVENTION

Technical Problems

In recent years, displays have been molded into various shapes according to purposes such as applications and designability. So, a protective material of a display is also required to be molded into a complicated shape. However, it is difficult to mold the laminated film described in Patent Document 1 into a complicated shape.

The present invention solves the above conventional problems, and an object thereof is to provide a laminated film that can be molded even into a complicated shape.

Solution to Problems

In order to solve the above-described problems, the present invention provides the following embodiments.

[1]
A laminated film comprising:
a transparent support substrate;
an uncured hard coat layer formed on at least one surface of the transparent support substrate; and
an uncured optical interference layer formed on the uncured hard coat layer, wherein
the uncured hard coat layer comprises an active energy ray-curable composition for forming a hard coat layer,
the uncured optical interference layer comprises an active energy ray-curable composition for forming a optical interference layer,
a thickness of the transparent support substrate is 50 μm or more and 600 μm or less,
a luminous reflectance including regular reflected light measured from an uncured optical interference layer side is 0.1% or more and 4.0% or less, and
a stretch ratio at 160° C. is 50% or more.

[2]
The laminated film according to [1] above, wherein the uncured optical interference layer has a thickness of 15 nm or more and 200 nm or less.

[3]
The laminated film according to [1] or [2] above, wherein the uncured hard coat layer has a thickness of 2 μm or more and 30 μm or less.

[4]
The laminated film according to any one of [1] to [3] above, wherein
a hardness measured from an uncured optical interference layer side by a nanoindentation method is 0.1 GPa or more and 0.5 GPa or less.

[5]
The laminated film according to any one of [1] to [4] above, wherein
a hardness measured by a nanoindentation method at the optical interference layer side of the laminated film irradiated with an active energy ray having an integral light quantity of 500 mJ/cm$^2$ is more than 0.5 GPa and 1.2 GPa or less.

[6]
The laminated film according to any one of [1] to [5] above, wherein
no scratches are visually recognized on the optical interference layer when the laminated film is irradiated with an active energy ray having an integral light quantity of 500 mJ/cm$^2$ and then a surface of the optical interference layer is rubbed 5000 times while a vertical load of 4.9 N is applied.

[7]
The laminated film according to any one of [1] to [6] above, further comprising at least one uncured functional layer between the uncured hard coat layer and the uncured optical interference layer.

[8]
A laminated member comprising the cured laminated film according to any one of [1] to [7] above.

Advantageous Effects of Invention

The laminated film of the present invention can be molded into a complicated shape.

DESCRIPTION OF EMBODIMENTS

As a protective film for a display, a laminated film called a precure type may be used. A hard coat layer and an optical interference layer contained in a precure type laminated film are usually cured in a step before a preform step, that is, in a step of forming each layer as disclosed in Patent Document 1. So, in the preform, the laminated film cannot follow a mold in a complicated shape, and cracks may occur in the laminated film.

In order to make the pre-cured laminated film follow the mold, the cross-link density of the laminated film can be reduced. However, a low crosslink density makes it difficult to obtain sufficient mechanical properties.

From such a viewpoint, it has conceived that a hard coat layer and an optical interference layer are not cured in a process of manufacturing a laminated film. The laminated film comprising the uncured hard coat layer and the uncured optical interference layer is of an after-cure type.

Since the after-cure type laminated film is subjected to a preform step in an uncured state, it can be molded into a complicated shape without generating cracks. The occurrence of cracks is suppressed, so that an improved outward appearance of a molded product is obtained and the functions of a hard coat layer and an optical interference layer are effectively exhibited. In addition, since the stretch ratio at 160° C. is 50% or more and the thickness of the transparent support substrate is 50 μm or more and 600 μm or less, even when molded into a complicated shape, the resulting laminated member has sufficient rigidity.

Furthermore, since there is no need to stretch after curing, each layer can be formed of a layer-forming composition having a high crosslinking density. That is, the hardness of each layer after curing can be further increased.

In addition, since both the hard coat layer and the optical interference layer are uncured, adhesion between the layers is high. Furthermore, the unevenness of the surface of each layer can be leveled by heat treatment. As a result, a laminated film having high smoothness can be obtained.

The laminated film has a luminous reflectance including regular reflected light of 0.1% or more and 4.0% or less. Therefore, the laminated film has superior antireflection performance. A laminated member obtained by curing it also has superior antireflection performance. The reflection of external light on the laminated member is reduced by the antireflection effect.

A. Laminated Film

The laminated film according to the present embodiment has a transparent support substrate, an uncured hard coat layer formed on at least one surface of the transparent support substrate, and an uncured optical interference layer formed on the uncured hard coat layer. The uncured hard coat layer contains an active energy ray-curable composition for forming a hard coat layer. The uncured optical interference layer comprises an active energy ray-curable composition for forming an optical interference layer.

The term "uncured" refers to a state in which the resin is not completely cured. The hard coat layer and the optical interference layer contained in the laminated film may be in a semi-cured state. The laminated film is of an after-cure type.

The term "cured" is synonymous with "dry through" defined in JIS K 5500 (glossary of terms for coating materials). That is, the term "cured" means a) when the center of a test piece is strongly sandwiched between the thumb and the forefinger, no dent due to the fingerprint is formed on the coating surface and no movement of the coating film is noticed, and when the coating surface is rapidly rubbed repeatedly with the fingertip, a dry hard state in which no scratch marks are formed is obtained.

The laminated film irradiated with an active energy ray having an integral light quantity of 100 mJ/cm² can be said to be cured.

Likewise, the term "semi-cured" is synonymous with "dry to touch" defined in JIS K 5500 (glossary of terms for coating materials). That is, the term "semi-cured" refers to when the center of a painted surface is lightly rubbed with a fingertip and the painted surface is in a dry to touch state with no rubbing marks. The laminated film irradiated with an active energy ray having an integral light quantity of 1 mJ/cm² or more and less than 100 mJ/cm² can be said to be semi-cured.

The term "uncured" refers to a state in which the hard coat layer and the optical interference layer are not exposed to active energy rays or are exposed to active energy rays of less than 1 mJ/cm².

(Luminous Reflectance)

The luminous reflectance of the laminated film including regular reflected light measured from the uncured optical interference layer side is 0.1% or more and 4.0% or less. In other words, the lower limit value of the luminous reflectance of the laminated film is 0.1%, and the upper limit value is 4.0%. That is, the laminated film has a superior antireflection property. A laminated member obtained by curing the laminated film also has a superior antireflection property. Accordingly, the laminated member has less reflection due to external light, and the laminated member has good display characteristics and good visibility. The luminous reflectance of the laminated member may also be 0.1% or more and 4.0% or less.

The fact that the luminous reflectance is within this range indicates that the occurrence of mixing of phases between the uncured hard coat layer and the uncured optical interference layer is suppressed and a clear interface is formed between both layers.

The luminous reflectance of the laminated film is preferably 0.1% or more and 3.0% or less, and more preferably 0.1% or more and 2.5% or less.

The luminous reflectance is obtained by measuring all reflected light including regular reflected light. Specifically, the luminous reflectance is measured by a so-called SCI (Specular Component Include) method. Since this method is hardly affected by the surface condition of the object to be measured, the luminous reflectance of the uncured layer can be measured.

Specifically, the luminous reflectance of the laminated film can be measured by the following method.

A black paint (for example, product name: CZ-805 BLACK (manufactured by NIKKO BICS Co., Ltd.) is applied to a surface of the transparent support substrate opposite from the uncured hard coat layer with a bar coater such that a dry film thickness is 3 μm or more and 6 μm or less. The evaluation sample M is then left to dry for 5 hours in a room temperature environment.

From the optical interference layer side of the obtained evaluation sample M, the luminous reflectance by the SCI method in a wavelength region of 380 nm or more and 780 nm or less is measured using a spectrophotometer (e.g., SD7000 manufactured by Nippon Denshoku Industries Co., Ltd.). The luminous reflectance of the laminated film according to the present embodiment is 0.1% or more and 4.0% or less in a wavelength region of 380 nm or more and 780 nm or less.

The luminous reflectance of the laminated member can be measured as follows.

The evaluation sample M prepared as described above is irradiated with an active energy ray having an integral light quantity of 500 mJ/cm² to form an evaluation sample N. The luminous reflectance is measured in the same manner as described above from the optical interference layer side of the obtained evaluation sample N. Before irradiation with an active energy ray, the laminated film may be heat-treated at 80° C. for 1 hour.

(Stretch Ratio)

The stretch ratio of the laminated film at 160° C. is 50% or more. In this case, the laminated film is sufficiently stretched at a molding temperature of 150° C. or more and 190° C. or less. Thus, the laminated film can be shaped into a complicated three-dimensional shape without generating cracks. In particular, damage to the laminated film is easily suppressed in the preform step. Therefore, a laminated member having functions of a hard coat layer and an optical interference layer and having a complicated three-dimensional shape can be obtained. After the preform step, the laminated film is subjected to main molding, e.g., insert molding, according to the required physical properties, shape, etc.

The functions of the hard coat layer and the optical interference layer are, for example, superior hard coat performance and antireflection performance. The hard coat performance may be, for example, high hardness, abrasion resistance, and chemical resistance.

The stretch ratio of the laminated film at 160° C. is preferably 60% or more, and more preferably 70% or more. The stretch ratio of the laminated film at 160° C. may be less than 400%, less than 350%, or less than 300%. In particular, when the laminated film is stretched at a stretch ratio of about 250%, it is desirable that breakage, cracks, changes in outward appearance, etc. are not visually recognized. The stretch ratio of the laminated member obtained by curing the laminated film at 160° C. is less than 15%, and may be 5% or less.

The stretch ratio can be measured, for example, as follows.

A tensile tester having a distance between chucks of 150 mm and an evaluation sample cut into a length of 200 mm×a width of 10 mm are prepared. Under a 160° C. atmosphere and under the conditions of a tensile force of 5.0 Kgf and a tensile speed of 300 mm/min, the long side of the evaluation sample is stretched by 50%. The stretched evaluation sample is observed with a microscope at a magnification of 1000 times or more, and the presence of cracks larger than a length of 100 μm and a width of 1 μm is checked.

When no cracks defined above are not generated, a new sample is cut out, and then the long side is stretched up to 60%. Then, the presence of cracks is checked by the same procedure. This procedure is repeated while increasing the stretch ratio by 10% and the stretch ratio when a crack having the above size is first observed is taken as the stretch ratio of the laminated film. The test may be performed in the same manner as described above with the initial stretch set to 250%.

(Thickness)

The thickness of the transparent support substrate is 50 μm or more and 600 μm or less. Thanks to this, even when the laminated film is stretched, the laminated film can maintain rigidity. In addition, warping of the laminated film during curing and after curing is easily suppressed. Furthermore, since the transparent support substrate and the laminated film can be wound into a roll form, roll-to-roll processing can be performed. The thickness of the transparent support substrate is preferably 100 μm or more, and more preferably 200 μm or more. The thickness of the transparent support substrate is preferably 500 μm or less, more preferably 480 μm or less, even more preferably 450 μm or less, and particularly preferably 400 μm or less.

The thickness of the uncured optical interference layer is not particularly limited, and may be appropriately set according to a design wavelength. The thickness of the uncured optical interference layer is 15 nm or more and 200 nm or less. The thickness of the uncured optical interference layer is preferably 60 nm or more, and more preferably 65 nm or more. The thickness of the uncured optical interference layer is preferably 180 nm or less. When the thickness of the uncured optical interference layer is in this range, good antireflection properties can be imparted to the laminated member.

The thickness of the uncured hard coat layer is not particularly limited. For example, a composition for forming a hard coat layer is applied such that the thickness of the uncured hard coat layer is 2 μm or more and 30 μm or less.

The uncured hard coat layer is a dried and uncured hard coat layer (hereinafter, simply referred to as uncured hard coat layer). When the uncured hard coat layer has such a thickness, warpage after curing is easily suppressed. In addition, a hard coat layer having superior hard coat performance is obtained.

The thickness of the uncured hard coat layer is more preferably 3 μm or more. The thickness of the uncured hard coat layer is more preferably 25 μm or less, and particularly preferably 20 μm or less.

(Hardness)

The hardness of the laminated film is not particularly limited. The hardness Hb measured by a nanoindentation method from the optical interference layer side of the laminated film is preferably 0.1 GPa or more from the viewpoint of easily suppressing damage in the subsequent steps. When the hardness Hb is 0.1 GPa or more, defects such as squeegee marks or suction marks are suppressed, and the yield is easily improved.

The hardness Hb is preferably 0.5 GPa or less in that adhesion between the uncured hard coat layer and the uncured optical interference layer is easily improved. The hardness Hb of the laminated film can be regarded as the maximum value of the hardness of the uncured hard coat layer or the uncured optical interference layer. When the hardness Hb is 0.5 GPa or less, in laminating the uncured optical interference layer on the uncured hard coat layer, both the layers easily adhere to each other. Furthermore, when the uncured hard coat layer and the uncured optical interference layer are laminated by bonding, entry of air between the layers (air entrapment) is suppressed. Specifically, the hardness Hb is preferably 0.1 GPa or more and 0.5 GPa or less.

The hardness Hb is more preferably 0.15 GPa or more, even more preferably 0.2 GPa or more, and particularly preferably 0.25 GPa or more. The hardness Hb is more preferably 0.45 GPa or less, even more preferably 0.42 GPa or less, and particularly preferably 0.4 GPa or less.

The hardness Hb of the laminated film is calculated based on a value measured by the nanoindentation method from the optical interference layer side of the laminated film. In the nanoindentation method, the measurement is preferably performed in a range of up to 300 nm from the surface of the optical interference layer, and particularly in a range of 50 nm or more and 100 nm or less from the surface layer of the optical interference layer. The hardness Hb of the laminated film is, for example, the maximum value of hardness calculated from values measured by the nanoindentation method in a range of 50 nm or more and 100 nm or less from the surface layer of the optical interference layer.

The hardness of the laminated member is usually higher than the hardness of the laminated film. Therefore, the hardness Ha measured by the nanoindentation method from the optical interference layer side of the laminated member can be set based on the hardness Hb of the laminated film.

When the hardness Hb of the laminated film is 0.5 GPa, the hardness Ha measured by the nanoindentation method from the optical interference layer side of the laminated film (laminated member) irradiated with an active energy ray having an integral light quantity of 500 mJ/cm$^2$ is, for example, more than 0.5 GPa and 1.2 GPa or less. The hardness Ha of the laminated member may be more than 0.7 GPa and 1.2 GPa or less.

When the hardness Hb of the laminated film is 0.4 GPa, the hardness Ha of the laminated member is, for example, more than 0.4 GPa and 1.2 GPa or less. The hardness Ha of the laminated member may be more than 0.7 GPa and 1.2

GPa or less. When the hardness Ha is more than 0.5 GPa, the hard coat performance of the laminated member is easily improved.

The hardness by the nanoindentation method is determined by, for example, continuous stiffness measurement using a nanoindentation device. In the continuous stiffness measurement, a minute load (alternating current (AC) load) is applied to a sample in addition to a quasi-static test load (direct current (DC) load). Thanks to this, the force applied to the sample slightly vibrates. Stiffness with respect to depth is calculated from the vibration component of the resulting displacement and the phase difference between the displacement and the load. Thanks to this, a continuous profile of hardness with respect to depth can be obtained.

For the continuous stiffness measurement, for example, Advanced Dynamic E and H. NMT method can be used. As the nanoindentation device, iMicro Nanoindenter manufactured by NANOMECHANICS, INC., can be used. In this case, the load and the stiffness can be calculated using dedicated software for iMicro. A load is applied to the sample by the indenter until the load reaches a maximum load of 50 mN. As the indenter, for example, a berkovich type diamond indenter is used. In the measurement and the calculation of stiffness, the Poisson's ratio of the coating layer, the load, etc. may be appropriately set to appropriate values.

(Abrasion Resistance)

The laminated member is desirably superior in abrasion resistance. For example, the laminated film is irradiated with an active energy ray at an integral light quantity of 500 mJ/cm$^2$ to obtain a laminated member. Then, the surface of the optical interference layer is rubbed 5000 times with a vertical load of 4.9 N. It is preferable that no scratch is visually recognized on the laminated member after the abrasion test. The fact that no scratch is visually recognized means that deterioration in visibility due to change in appearance is suppressed.

The abrasion test is performed using a known method under the above conditions. In the abrasion test, a friction element to which a cotton cloth is fixed is usually used. This friction element applies a vertical load of 4.9 N to the sample.

Before irradiation with an active energy ray, the laminated film may be heated in an atmosphere of 150 to 190° C. for 30 to 60 seconds. Thanks to this, the surface of the laminated film is smoothened by leveling, and the abrasion resistance is more easily improved.

"No scratch is visually recognized" means that no scratch can be visually observed. The "scratch" is, for example, roughness of the surface. As long as no scratches are visually observed, very slight scratches may be observed when the sample after the abrasion test is observed using a microscope at a magnification of 100 times.

In the following, the transparent support substrate and each layer included in the laminated film of the present embodiment will be further described.

[Transparent Support Substrate]

The transparent support substrate is not particularly limited as long as it is transparent. Thanks to this, when a later-described decorative layer is provided on the laminated member, designability is further enhanced. To be transparent specifically means that the total light transmittance is 80% or more. The total light transmittance of the transparent support substrate is 80% or more, and preferably 90% or more. The total light transmittance can be measured by a method in accordance with JIS K 7361-1. As the transparent support substrate, those known in the art are used without particular limitation. The transparent support substrate may be either colorless or colored.

The transparent support substrate is appropriately selected according to the application. Examples of the transparent support substrate include polycarbonate (PC)-based films; polyester-based films such as polyethylene terephthalate and polyethylene naphthalate; cellulose-based films such as diacetylcellulose and triacetylcellulose; acrylic films such as polymethyl methacrylate (PMMA); styrene-based films such as polystyrene and acrylonitrile-styrene copolymers; olefin-based films such as polyvinyl chloride, polyethylene, polypropylene, polyolefin having a cyclic or norbornene structure, and ethylene-propylene copolymers; and amide-based films such as nylon and aromatic polyamide. Further, the transparent support substrate may be a film comprising a resin such as polyimide, polysulfone, polyether sulfone, polyether ether ketone, polyphenylene sulfide, polyvinyl alcohol, polyvinylidene chloride, polyvinyl butyral, polyallylate, polyoxymethylene, and epoxy resin, or may be a film comprising a blend of those polymers.

The transparent support substrate may be a laminate of a plurality of films. For example, the transparent support substrate may be a laminate made up of a film made of an acrylic resin and a film made of a polycarbonate-based resin.

The transparent support substrate may have either optical anisotropy or isotropy. The magnitude of birefringence of the transparent support substrate having optical anisotropy is not particularly limited. The phase difference of the transparent support substrate having anisotropy may be ¼ of the wavelength (λ/4) or may be ½ of the wavelength (λ/2).

[Uncured Hard Coat Layer]

The uncured hard coat layer contains an active energy ray-curable composition for forming a hard coat layer, which hereinafter may be referred to as composition HC. The composition HC is cured by active energy rays.

The active energy ray is an ionizing radiation such as an ultraviolet ray, an electron beam, an α ray, a β ray, or a γ ray. The composition HC is preferably especially of an ultraviolet-curable type.

The composition HC contains an active energy ray-curable resin component. The active energy ray-curable resin component has a polymerizable group having an unreacted unsaturated bond (a polymerizable unsaturated group; typically a (meth)acryloyl group). The unreacted polymerizable unsaturated group has, for example, a double bond represented by C=C. When irradiation with an active energy ray is performed, an unreacted polymerizable unsaturated group reacts, so that the double bond disappears. The disappearance of the double bond can be confirmed by a known method such as FT-IR.

When the uncured hard coat layer is irradiated with an active energy ray having an integral light quantity of 500 mJ/cm$^2$, 10% to 100% of the unreacted polymerizable unsaturated groups contained in the uncured hard coat layer disappear.

The disappearance ratio of the unreacted polymerizable unsaturated groups when the uncured hard coat layer is irradiated with an active energy ray having an integral light quantity of 500 mJ/cm$^2$ may be 15% or more and 90% or less, 20% or more and 80% or less, 30% or more and 70% or less, or 30% or more and 60% or less.

The disappearance ratio of the unreacted polymerizable unsaturated groups when the uncured hard coat layer is irradiated with an active energy ray having an integral light quantity of 30 mJ/cm$^2$ may be 10% or more and 50% or less.

The disappearance ratio of the unreacted polymerizable unsaturated groups when the uncured hard coat layer is irradiated with an active energy ray having an integral light quantity of 5 mJ/cm$^2$ may be 10% or more and 30% or less, or may be 10% or more and 50% or less.

As the disappearance ratio of the unreacted polymerizable groups increases, the crosslinking density increases. Accordingly, the hardness of the hard coat layer tends to be high and the stretch ratio tends to be low. By adjusting the integral light quantity of the active energy ray, the hardness and/or the stretch ratio of the hard coat layer can be controlled.

For example, a preform is applied to a laminated film that has not been irradiated with active energy rays. Thereafter, prior to a main molding step, the laminated film is irradiated with an active energy ray to such an extent that the laminated film is not completely cured, so that the stretch ratio of the laminated film is adjusted to 1% or more and 15% or less. Thanks to this, the laminated film can be slightly stretched to such an extent that the shape applied in the preform step can be maintained. Thanks to this, even when there is a slight dimensional difference between the mold to be used in the preform step and the mold to be used in the main molding step, the laminated film can be shaped while suppressing the generation of cracks in the main molding step. In addition, since the hardness of the hard coat layer is increased by irradiation with an active energy ray, adhesion of the hard coat layer to the mold is suppressed in the main molding step. Examples of the main molding include injection molding such as insert molding.

Specifically, after the preform step, the laminated film is irradiated with an active energy ray having an integral light quantity of 1 mJ/cm$^2$ or more and 100 mJ/cm$^2$ or less (semi-curing). Thanks to this, the laminated film is easily shaped along the mold used in the present molding while suppressing the occurrence of cracks. Thereafter, main molding is performed. Subsequently, irradiation with an active energy ray having an integral light quantity of 100 mJ/cm$^2$ or more is performed (main curing).

The disappearance ratio of the unreacted polymerizable unsaturated groups does not change much before and after heating. In other words, by the heat treatment, the curing of the composition HC hardly proceeds. Thus, before semi-curing or main curing, the uncured hard coat layer can be subjected to heat treatment without affecting the adhesion of the hard coat layer or the stretch ratio of the laminated film. The smoothness of the hard coat layer can be improved by the heat treatment. Accordingly, the smoothness of the obtained laminated member is also improved.

The molecular weight distribution of the active energy ray-curable resin component does not change much before and after the heat treatment. The fact that the molecular weight distribution does not change much means that the peak of the weight average molecular weight, and when there are a plurality of molecular weight peaks, the shift amount in the height direction and the shift amount in the lateral direction of each molecular weight peak all fall within the range of ±5%.

The heat treatment is performed under conditions that do not affect the performance of the hard coat layer. The conditions for the heat treatment may be appropriately set according to the composition of the composition HC. The temperature of the heat treatment may be 90° C. or more and 200° C. or less, 100° C. or more and 200° C. or less, or 110° C. or more and 200° C. or less. The time of the heat treatment may be 10 seconds or more and 10 minutes or less.

The heat treatment may be performed by utilizing heat applied in the preform step. By performing the preform at about 150° C. or more and 190° C. or less, the uncured hard coat layer can be sufficiently leveled while performing the preform.

(Composition HC)

The hard coat layer is laminated in an uncured state with the uncured optical interference layer. Furthermore, the laminated film is subjected to various processing in an uncured state. Therefore, the uncured hard coat layer is required to have high hardness, to have low tack and be less likely to be polluted, to suppress damage and change in outward appearance during processing, to suppress curling due to a difference in thermal shrinkage from other layers, etc.

Examples of the damage during processing include recesses such as suction marks, and squeegee marks formed in the printing process. Examples of the change in outward appearance during processing include foaming and cracking in the preform step.

These requirements can be achieved by controlling the hardness, rigidity, smoothness, tackiness, etc. of the uncured hard coat layer. The physical properties of the uncured hard coat layer can be adjusted by the thickness thereof, the composition of the composition HC, etc.

<Resin Component>

The composition HC contains an active energy ray-curable resin component. The active energy ray-curable resin component includes a monomer, oligomer, or polymer that can be crosslinked and cured by active energy rays.

Specific examples of the active energy ray-curable resin component include monomers, oligomers, or polymers having at least one polymerizable unsaturated group (hereinafter may be referred to as reactive resin). More specific examples of the active energy ray-curable resin component include (meth)acrylate compounds such as a (meth)acrylate monomer, a (meth)acrylate oligomer, and a (meth)acrylate polymer; urethane (meth)acrylate compounds such as a urethane (meth)acrylate monomer, a urethane (meth)acrylate oligomer, and a urethane (meth)acrylate polymer; and silicon (meth)acrylate compounds such as a silicon (meth)acrylate monomer, a silicon (meth)acrylate oligomer, and a silicon (meth)acrylate polymer. These are used singly or two or more of them are used in combination. "(Meth)acrylate" means acrylate and/or methacrylate.

Among them, a reactive resin is preferable. The crosslinking density of the cured hard coat layer is easily increased by the reactive resin. Accordingly, superior hard coat performance is exhibited.

The weight-average molecular weight (Mw) of the reactive resin is preferably 5000 or more and 100000 or less, more preferably 6000 or more and 95000 or less, and even more preferably 9000 or more and 90000 or less. The glass transition temperature (Tg) of the reactive resin is, for example, preferably 40° C. or more and 120° C. or less, and more preferably 40° C. or more and 110° C. or less. This makes it easier to further improve the smoothness and rigidity of the uncured hard coat layer. In particular, a reactive acrylic resin is preferable.

The weight-average molecular weight (Mw) can be calculated based on the molecular weight of standard polystyrene from a chromatogram measured by gel permeation chromatography.

The composition HC may comprise a non-reactive resin. The composition HC may comprise a non-reactive resin together with a reactive resin. The composition HC may comprise two or more reactive resins and two or more non-reactive resins.

The non-reactive resin is a resin that does not react or hardly exhibits reactivity even when irradiated with an active energy ray (typically, ultraviolet rays). Examples of the non-reactive resin include urethane resin, acrylic resin, polyester resin, and epoxy resin. The weight-average molecular weight (Mw) of the non-reactive resin is preferably 5000 or more and 100000 or less, and more preferably 6000 or more and 95000 or less.

When a plurality of reactive resins and/or non-reactive resins are contained, it is just required that the Mw of one resin is 5000 or more and 100000 or less. The Mw of the other resins is not particularly limited. The Mw of the other resins may be, for example, 10000 or more and 80000 or less. When resins having various weight-average molecular weights are used in combination, the uncured hard coat layer tends to have high smoothness, and it is easy to adjust the hardness of the uncured hard coat layer to a desired range.

The composition HC preferably contains at least one of a non-reactive acrylic resin and a reactive acrylic resin. Although it should not be construed as being limited to a particular theory, this can increase the smoothness and rigidity of the uncured hard coat layer.

The total content of the reactive acrylic resin and/or the non-reactive acrylic resin is preferably more than 20 parts by mass and 60 parts by mass or less, more preferably 30 parts by mass or more and 60 parts by mass or less, and particularly preferably 35 parts by mass or more and 60 parts by mass or less, per 100 parts by mass of the solid content of the composition HC.

The solid content of the composition HC is the above-described active energy ray-curable resin component, non-reactive resin, photopolymerization initiator, inorganic oxide fine particles, etc. The same applies to the solid content of the composition for forming an optical interference layer.

The composition HC preferably comprises at least one selected from among a polyfunctional (meth)acrylate compound, a polyfunctional urethane (meth)acrylate compound, and a polyfunctional silicon (meth)acrylate compound. Thanks to this, the uncured hard coat layer exhibits a high viscosity at normal temperature, and the viscosity thereof is decreased by heating. Thus, the uncured hard coat layer exhibits good adhesion to the uncured optical interference layer, and is easily shaped into a complicated shape. Furthermore, since the cured hard coat layer has a high cross-linking density, the hard coat performance is further improved.

Among them, the composition HC preferably comprises a reactive acrylic resin and/or a non-reactive acrylic resin, and a polyfunctional urethane (meth)acrylate monomer and/or oligomer. Thanks to this, the shapeability of an uncured hard coat layer and adhesion with the uncured optical interference layer are easily further improved. In addition, the hard coat performance of the cured hard coat layer is easily improved.

In particular, the composition HC preferably comprises a reactive acrylic resin and/or a non-reactive acrylic resin having an Mw of 5000 or more and 100000 or less and a polyfunctional urethane (meth)acrylate monomer and/or oligomer having an acrylate equivalent of 100 g/eq. or more and 200 g/eq. or less. Thanks to this, the low tackiness of the uncured hard coat layer is further improved.

The content of the polyfunctional urethane (meth)acrylate monomer and/or oligomer is preferably 5 parts by mass or more and 70 mass or less, more preferably 10 parts by mass or more and 70 parts by mass or less, and particularly preferably 13 parts by mass or more and 68 parts by mass or less, per 100 parts by mass of the solid content of the composition HC.

The acrylate equivalent of the polyfunctional urethane (meth)acrylate monomer and/or oligomer may be 110 g/eq. or more and 180 g/eq. or less, and may be 115 g/eq. or more and 160 g/eq. or less.

The composition HC may comprise a reactive acrylic resin and/or a non-reactive acrylic resin, and at least one selected from the group consisting of a polyfunctional silicon (meth)acrylate monomer and/or oligomer, and inorganic oxide fine particles.

In particular, the composition HC preferably comprises a reactive acrylic resin and/or a non-reactive acrylic resin, a polyfunctional silicon (meth)acrylate monomer and/or oligomer, and inorganic oxide fine particles.

Although it should not be construed as being limited to a particular theory, the polyfunctional silicon (meth)acrylate monomer and/or oligomer makes it possible to reduce the surface tension of the uncured hard coat layer and improve the leveling property. The inorganic oxide fine particles suppress volume shrinkage of the uncured hard coat layer and easily increase rigidity. Thus, change in appearance during the process of manufacturing the uncured hard coat layer is easily suppressed. Furthermore, change in outward appearance of the cured hard coat layer and occurrence of curling are also suppressed. In addition, the tackiness of the cured hard coat layer is reduced, and the abrasion resistance tends to be increased.

The Mw of the polyfunctional silicon (meth)acrylate monomer and/or oligomer is preferably 700 or more and 100000 or less, more preferably 800 or more and 90000 or less, and preferably 800 or more and 85000 or less.

The content of the polyfunctional silicon (meth)acrylate monomer and/or oligomer is preferably 0.1 parts by mass or more and 50 mass or less, more preferably 1 part by mass or more and 45 parts by mass or less, and particularly preferably 1.5 parts by mass or more and 40 parts by mass or less, per 100 parts by mass of the solid content of the composition HC.

The content of the inorganic oxide fine particles is preferably 1 part by mass or more and 55 parts by mass or less, more preferably 10 parts by mass or more and 50 parts by mass or less, and particularly preferably 12 parts by mass or more and 40 parts by mass or less, per 100 parts by mass of the solid content of the composition HC.

The inorganic oxide fine particles are not particularly limited. Examples of the inorganic oxide fine particles include silica ($SiO_2$) particles, alumina particles, titania particles, tin oxide particles, antimony-doped tin oxide (ATO) particles, zinc oxide particles, and zirconia oxide particles. The surface of the inorganic oxide fine particles may be modified with a functional group containing an unsaturated double bond. The functional group is desirably a (meth)acryloyl group. Among them, silica particles and alumina particles are preferable from the viewpoint of cost and coating material stability, and in particular, silica particles and alumina particles whose surfaces are modified with a functional group are preferable. The form of the inorganic oxide fine particles may be sol.

The primary particle diameter of the inorganic oxide fine particles is not particularly limited. From the viewpoint of transparency and coating material stability, the primary particle diameter of the inorganic oxide fine particles is preferably 5 nm or more and 100 nm or less. The primary particle diameter of the inorganic oxide fine particles is a value measured using image processing software from an image of a cross section taken with an electron microscope. The average particle diameter of other granular materials is also determined by the same method.

(Silica Particles)

Examples of commercially available silica particles (colloidal silica) are shown below.

Manufactured by Nissan Chemical Corporation: IPA-ST, MEK-S TM, IBK-S T, PGMST, XBA-S T, MEK-AC-2101, MEK-AC-2202, and MEKAC-4101 M I B K-SD Manufactured by FUSO CHEMICAL CO., LTD.: PL-1-IPA, PL-1-TOL, PL-2-IPA, PL-2-MEK, and PL-3-TOL Manufactured by JGC Catalysts and Chemicals Ltd.: OSCAL series and ELECOM series Manufactured by BYK Japan KK: NANOBYK-3605

(Alumina Particles)

Examples of commercially available alumina particles are shown below.

Manufactured by Sumitomo Osaka Cement Co., Ltd.: AS-15 0 I and AS-150 T

Manufactured by BYK Japan KK: NANOBYK-3601, NANOBYK-3602, and NANOBYK-3610

(Zirconia Oxide Particles)

Examples of commercially available zirconia oxide particles are shown below.

Manufactured by Sakai Chemical Industry Co., Ltd.: SZR-K and SZR-KM

Manufactured by CIK NanoTek Corporation: ZRANB15WT %-P02, ZRMIBK15WT %-P01, and ZRMIBK15WT %-F85

Manufactured by Solar: NANON5ZR-010 and NANON5ZR-020

Examples of the (meth)acrylate monomer or oligomer include methyl (meth)acrylate, ethyl (meth)acrylate, n-butyl (meth)acrylate, isobutyl (meth)acrylate, 2-ethylhexyl (meth)acrylate, acrylic acid, methacrylic acid, isostearyl (meth)acrylate, ethoxylated o-phenylphenol acrylate, methoxypolyethylene glycol acrylate, methoxypolyethylene glycol acrylate, phenoxypolyethylene glycol acrylate, 2-acryloyloxyethyl succinate, 2-hydroxyethyl (meth)acrylate, 2-hydroxypropyl (meth)acrylate, ethylene glycol mono(meth)acrylate, propylene glycol mono(meth)acrylate, 2-hydroxy-3-methoxypropyl (meth)acrylate, N-methylol(meth)acrylamide, and N-hydroxy(meth)acrylamide.

(Polyfunctional (Meth)Acrylate Monomer or Oligomer)

Examples of commercially available polyfunctional (meth)acrylate monomer or oligomer are shown below.

DPHA (manufactured by Daicel-Allnex Ltd.), PETRA (manufactured by Daicel-Allnex Ltd., pentaerythritol triacrylate), PETIA (manufactured by Daicel-Allnex Ltd.), ARONIX M-403 (manufactured by Toagosei Co., Ltd., dipentaerythritol penta and hexaacrylate), ARONIX M-402 (manufactured by Toagosei Co., Ltd., dipentaerythritol penta and hexaacrylate), ARONIX M-400 (manufactured by Toagosei Co., Ltd., dipentaerythritol penta and hexaacrylate), SR-399 (manufactured by Arkema, dipentaerythritol hydroxypentaacrylate), KAYARAD DPHA (manufactured by Nippon Kayaku Co., Ltd.), KAYARAD DPHA-2C (manufactured by Nippon Kayaku Co., Ltd.), ARONIX M-404, M-405, M-406, M-450, M-305, M-309, M-310, M-315, M-320, TO-1200, TO-1231, TO-595, TO-756 (manufactured by Toagosei Co., Ltd.), KAYARD D-310, D-330, DPHA, DPHA-2C (manufactured by Nippon Kayaku Co., Ltd.), and NIKALAC MX-302 (manufactured by Sanwa Chemical Co., Ltd.).

Examples of the (meth)acrylate polymer include at least one polymer of the (meth)acrylate monomer and oligomer described above.

(Polyfunctional Urethane (Meth)Acrylate Monomer or Oligomer)

Examples of commercially available polyfunctional urethane (meth)acrylate monomer or oligomer are shown below.

Bifunctional urethane (meth)acrylates ("UX-2201", "UX-8101", and "UX-6101" manufactured by Nippon Kayaku Co., Ltd., "UF-8001" and "UF-8003" manufactured by Kyoeisha Chemical Co., Ltd., "Ebecryl 244", "Ebecryl 284", "Ebecryl 2002", "Ebecryl 4835", "Ebecryl 4883", "Ebecryl 8807", and "Ebecryl 6700" manufactured by Daicel-Allnex Ltd.); trifunctional urethane (meth)acrylates ("Ebecryl 254", "Ebecryl 264", and "Ebecryl 265" manufactured by Daicel-Allnex Ltd.); tetrafunctional urethane (meth)acrylates ("Ebecryl8210" manufactured by Daicel-Allnex Ltd.); hexafunctional urethane (meth)acrylates ("Ebecryl 1290k", "Ebecryl 5129", "Ebecryl 220", "KRM-8200", and "Ebecryl 1290N" manufactured by Daicel-Allnex Ltd.); nonafunctional urethane (meth)acrylates ("KRM-7804" manufactured by Daicel-Allnex Ltd.); decafunctional urethane (meth)acrylates ("KRM-8452" and "KRM-8509" manufactured by Daicel-Allnex Co., Ltd.); and pentadecafunctional urethane (meth)acrylates ("KRM-8655" manufactured by Daicel-Allnex Ltd.).

The urethane (meth)acrylate monomer or oligomer can be prepared, for example, by reacting a polycarbonate diol, a (meth)acrylate compound containing a hydroxyl group and an unsaturated double bond group in the molecule thereof, and a polyisocyanate.

Examples of the urethane (meth)acrylate polymer include a polymer of at least one of the above-mentioned urethane (meth)acrylate monomers and oligomers.

The silicon (meth)acrylate monomer or oligomer is a (meth)acrylate monomer or oligomer having a siloxane linkage. A functional group containing a fluorine atom may be bonded to the silicon atom.

(Polyfunctional Silicon (Meth)Acrylate Monomers and Oligomers)

Examples of commercially available polyfunctional silicon (meth)acrylate monomer or oligomer are shown below.

Compound having methacryloyl group and acryloyl group

Manufactured by BYK: BYK-UV3500 and BYK-UV3570

Manufactured by Shin-Etsu Chemical Co., Ltd.: Shin-Etsu Silicone X-22-164, Shin-Etsu Silicone X-22-164AS, Shin-Etsu Silicone X-22-164A, Shin-Etsu Silicone X-22-164B, Shin-Etsu Silicone X-22-164C, Shin-Etsu Silicone X-22-164E, Shin-Etsu Silicone X-22-174DX, Shin-Etsu Silicone X-22-2426, Shin-Etsu Silicone X-22-2475, KER-4000-UV, KER-4700-UV, KER-4710-UV, and KER-4800-UV.

Manufactured by JNC: FM-0711, FM-0721, FM-0725, TM-0701, FM-7711, FM-7721, and FM-7725

Evonik Japan: TEGO (registered trademark) Rad 2010 and TEGO (registered trademark) Rad 2011

Polyfunctional silicon (meth)acrylate monomer or oligomer having a fluorine atom Manufactured by Mitsubishi Chemical Corporation: Shikoh UV-AF305

Manufactured by T&K TOKA: ZX-212 and ZX-214-A

Manufactured by Shin-Etsu Chemical Co., Ltd.: KY-1203

The composition HC may comprise a reactive acrylic resin and/or a non-reactive acrylic resin and at least one selected from the group consisting of a polyfunctional urethane acrylate monomer and/or oligomer, a polyfunctional silicon (meth)acrylate monomer and/or oligomer having a fluorine atom, and inorganic oxide fine particles.

<Photopolymerization Initiator>

The composition HC preferably comprises a photopolymerization initiator. Thanks to this, polymerization of the active energy ray-curable resin component easily proceeds.

Examples of the photopolymerization initiator include alkylphenone-based photopolymerization initiators, acylphosphine oxide-based photopolymerization initiators, titanocene-based photopolymerization initiators, and oxime ester-based polymerization initiators.

Examples of the alkylphenone-based photopolymerization initiators include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1(4-morpholinophenyl)butanone-1, and 2-(dimethylamino)-2-[(4-methylphenyl)methyl]-1-[4-(4-morpholinyl)phenyl]-1-butanone.

Examples of the acylphosphine oxide-based photopolymerization initiators include 2,4,6-trimethylbenzoyl-diphenyl-phosphine oxide and bis(2,4,6-trimethylbenzoyl)-phenylphosphine oxide.

Examples of the titanocene-based photopolymerization initiators include bis(η5-2,4-cyclopentadien-1-yl)-bis(2,6-difluoro-3-(1H-pyrrol-1-yl)-phenyl)titanium.

Examples of the oxime ester-based polymerization initiator include 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), oxyphenylacetic acid, 2-[2-oxo-2-phenylacetoxyethoxy]ethyl ester, and 2-(2-hydroxyethoxy)ethyl ester. These photopolymerization initiators are used singly or two or more of them are used in combination.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The amount of the photopolymerization initiator is preferably 0.01 parts by mass or more and 10 parts by mass or less, and more preferably 1 part by mass or more and 10 parts by mass or less, per 100 parts by mass of the solid content of the composition HC.

<Solvent>

The composition HC may comprise a solvent. The solvent is not particularly limited, and is appropriately selected in consideration of the components contained in the composition, the type of the transparent support substrate, the application method, etc.

Examples of the solvent include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole, and phenetole; ester solvents such as ethyl acetate, butyl acetate, isopropyl acetate, and ethylene glycol diacetate; amide solvents such as dimethylformamide, diethylformamide, and N-methylpyrrolidone; cellosolve solvents such as methyl cellosolve, ethyl cellosolve, and butyl cellosolve; alcohol solvents such as methanol, ethanol, propanol, isopropyl alcohol, butanol, and isobutyl alcohol; and halogen-containing solvents such as dichloromethane and chloroform. These solvents are used singly or two or more of them are used in combination. Among them, ester solvents, ether solvents, alcohol solvents, and ketone solvents are preferable.

<Others>

The composition HC may comprise various additives as necessary. Examples of the additives include antistatic agents, plasticizers, surfactants, antioxidants, ultraviolet absorbers, surface conditioners, leveling agents, and light stabilizers (e.g., hindered amine light stabilizer (HALS)).

[Uncured Optical Interference Layer]

The uncured optical interference layer contains an active energy ray-curable composition for forming an optical interference layer, which hereinafter may be referred to as composition R. The composition R is cured by active energy rays. The composition R is preferably cured by the same type of active energy ray as the composition HC.

The optical interference layer may function as a layer having a low refractive index. The refractive index of the cured optical interference layer is 1.35 or more and 1.55 or less, and may be 1.38 or more and 1.55 or less, and may be 1.38 or more and 1.51 or less. Thanks to this, desired reflectivity is exhibited.

The optical interference layer may function as a layer having a high refractive index or a layer having a medium refractive index. The refractive index of the high refractive index layer may be, for example, more than 1.55 and 2.00 or less. The refractive index of the medium refractive index layer is not particularly limited as long as it is between the low refractive index layer and the high refractive index layer. The refractive index of the medium refractive index layer may be, for example, 1.55 or more and 1.70 or less.

The thickness of the optical interference layer is not particularly limited. The thickness the optical interference layer may be 10 nm or more and 300 nm or less. The thickness of the optical interference layer is preferably 15 nm or more, more preferably 40 nm or more, and particularly preferably 60 nm or more. The thickness of the optical interference layer is preferably 200 nm or less, more preferably 180 nm or less, and particularly preferably 150 nm or less.

The composition R comprises an active energy ray-curable resin component. The active energy ray-curable resin component has a polymerizable group having an unreacted unsaturated bond (a polymerizable unsaturated group; typically a (meth)acryloyl group).

When the uncured optical interference layer is irradiated with an active energy ray having an integral light quantity of 500 mJ/cm$^2$, 10% to 100% of the unreacted polymerizable unsaturated groups contained in the uncured optical interference layer disappear.

The disappearance ratio of the unreacted polymerizable unsaturated groups when the uncured optical interference layer is irradiated with an active energy ray having an integral light quantity of 500 mJ/cm$^2$ may be 15% or more and 90% or less, or may be 20% or more and 80% or less, or may be 30% or more and 70% or less, or may be 30% or more and 60% or less.

The disappearance ratio of the unreacted polymerizable unsaturated groups when the uncured optical interference layer is irradiated with an active energy ray having an integral light quantity of 5 mJ/cm$^2$ may be 10% or more and 30% or less, or may be 10% or more and 50% or less.

The disappearance ratio of the unreacted polymerizable unsaturated groups when the uncured optical interference layer is irradiated with an active energy ray having an integral light quantity of 30 mJ/cm$^2$ may be 10% or more and 50% or less.

As the disappearance ratio of the unreacted polymerizable groups increases, the crosslinking density increases. Thus, the hardness of the optical interference layer is high, and the stretch ratio tends to be low. By adjusting the integral light quantity of the active energy ray, the hardness and/or the stretch ratio of the optical interference layer can be controlled.

Also in the uncured optical interference layer, the disappearance ratio of the unreacted polymerizable unsaturated groups does not change much before and after heat treatment. In other words, by the heat treatment, the curing of the composition R hardly proceeds. Therefore, the uncured optical interference layer can be subjected to heat treatment before the active energy ray irradiation step without affecting the adhesion of the optical interference layer and the stretch ratio of the laminated film. By the heat treatment, the smoothness of the optical interference layer can be improved. Accordingly, the smoothness of the obtained laminated member is also improved.

The heat treatment is performed under conditions that do not affect the performance of the optical interference layer. The conditions for the heat treatment may be appropriately set according to the composition of the composition R. The temperature of the heat treatment may be 90° C. or more and 200° C. or less, 100° C. or more and 200° C. or less, or 110° C. or more and 200° C. or less. The time of the heat treatment may be 10 seconds or more and 10 minutes or less.

The heat treatment also may be performed by utilizing heat applied in the preform step. The uncured optical interference layer can be sufficiently leveled while being preformed.

(Composition R)

The optical interference layer is laminated in an uncured state with the uncured hard coat layer. Furthermore, as described above, the laminated film is subjected to various processing in an uncured state. So, the optical interference layer is required to have the same performance as that of the hard coat layer in addition to antireflection performance. In particular, the optical interference layer is required to have superior antireflection performance, to have low tack and be less likely to be polluted, and to suppress damage and change in outward appearance during processing. Examples of the change in outward appearance during processing include streaks called zipping marks generated when the protective film is peeled off.

These requirements can be achieved by controlling the hardness, rigidity, smoothness, tackiness, etc. of the uncured optical interference layer. The physical properties of the uncured optical interference layer can be adjusted by the thickness thereof, the composition of the composition R, etc.

<Resin Component>

The composition R comprises an active energy ray-curable resin component. The active energy ray-curable resin component includes a monomer, oligomer, or polymer (reactive resin) that can be crosslinked and cured by active energy rays. Examples of the active energy ray-curable resin component contained in the composition R may be the same as those of the active energy ray-curable resin components contained in the composition HC.

Among them, a reactive resin is preferable. The weight-average molecular weight (Mw) of the reactive resin is preferably 5000 or more and 100000 or less, more preferably 6000 or more and 95000 or less, and even more preferably 9000 or more and 90000 or less. The glass transition temperature (Tg) of the reactive resin is, for example, preferably 40° C. or more and 120° C. or less, and more preferably 40° C. or more and 110° C. or less. This makes it easier to further improve the smoothness and rigidity of the uncured optical interference layer. In particular, a reactive acrylic resin is preferable.

The composition R may comprise a non-reactive resin. Examples of the non-reactive resin may be the same as those of the non-reactive resin contained in the composition HC. The weight-average molecular weight (Mw) of the non-reactive resin is preferably 5000 or more and 100000 or less, and more preferably 6000 or more and 95000 or less.

The composition R may comprise a non-reactive resin together with a reactive resin. The composition R may comprise two or more reactive resins and two or more non-reactive resins.

The total content of the reactive acrylic resin and/or the non-reactive acrylic resin is preferably more than 5 parts by mass and 40 parts by mass or less, more preferably 10 parts by mass or more and 30 parts by mass or less, and particularly preferably 15 parts by mass or more and 25 parts by mass or less, per 100 parts by mass of the solid content of the composition R.

When a plurality of reactive resins and/or non-reactive resins are contained, it is just required that the Mw of one resin is 5000 or more and 100000 or less. The Mw of the other resins is not particularly limited. The Mw of the other resins may be, for example, 10000 or more and 80000 or less. When resins having various weight-average molecular weights are used in combination, the uncured optical interference layer tends to have high smoothness, and it is easy to adjust the hardness of the uncured optical interference layer to a desired range.

Among them, the composition R preferably comprises a reactive acrylic resin and/or a non-reactive acrylic resin, and a polyfunctional urethane (meth)acrylate monomer and/or oligomer. Thanks to this, an uncured optical interference layer having low tackiness and being less likely to be contaminated is easily obtained. Furthermore, the adhesion between the uncured hard coat layer and the uncured optical interference layer is improved. Examples of the polyfunctional urethane (meth)acrylate monomer and oligomer may be the same as those of the polyfunctional urethane (meth)acrylate monomer and oligomer contained in the composition HC.

In particular, the composition R preferably comprises a reactive acrylic resin and/or a non-reactive acrylic resin having an Mw of 5000 or more and 100000 or less and a polyfunctional urethane (meth)acrylate monomer and/or oligomer having an acrylate equivalent of 100 g/eq. or more and 200 g/eq. or less.

The content of the polyfunctional urethane (meth)acrylate monomer and/or oligomer is preferably 5 parts by mass or more and 70 mass or less, more preferably 10 parts by mass or more and 70 parts by mass or less, and particularly preferably 13 parts by mass or more and 68 parts by mass or less, per 100 parts by mass of the solid content of the composition R.

The acrylate equivalent of the polyfunctional urethane (meth)acrylate monomer and/or oligomer may be 110 g/eq. or more and 180 g/eq. or less, and may be 115 g/eq. or more and 160 g/eq. or less.

The composition R may comprise a reactive acrylic resin and/or a non-reactive acrylic resin, and at least one selected from the group consisting of a polyfunctional silicon (meth)acrylate monomer and/or oligomer, a fluororesin, and inorganic oxide fine particles.

Among them, the composition R preferably comprises a reactive acrylic resin and/or a non-reactive acrylic resin, a polyfunctional silicon (meth)acrylate monomer and/or oligomer, a fluororesin, and inorganic oxide fine particles.

Although it should not be construed as being limited to a particular theory, the polyfunctional silicon (meth)acrylate makes it possible to reduce the surface tension of the uncured optical interference layer, improve the leveling property, and reduce the tackiness. Since slipperiness is imparted to the uncured and cured optical interference layers by the fluororesin, abrasion resistance is easily improved. The inorganic oxide fine particles suppress volume shrinkage of the uncured optical interference layer and easily increase rigidity. Thus, change in outward appearance during the process of producing the uncured optical interference layer is easily suppressed. Furthermore, a change in appearance of the cured optical interference layer and occurrence of curling are also suppressed. In addition, the tackiness of the cured optical interference layer is reduced and the abrasion resistance is easily improved.

Examples of the polyfunctional silicon (meth)acrylate monomer and/or oligomer may be the same as those of the polyfunctional silicon (meth)acrylate monomer and/or oligomer contained in the composition HC.

Examples of the inorganic oxide fine particles may be the same as those of the inorganic oxide fine particles contained in the composition HC.

The Mw of the polyfunctional silicon (meth)acrylate monomer and/or oligomer is preferably 700 or more and 100000 or less, more preferably 800 or more and 90000 or less, and preferably 800 or more and 85000 or less.

The content of the polyfunctional silicon (meth)acrylate monomer and/or oligomer is preferably 5 parts by mass or more and 50 mass or less, more preferably 10 parts by mass or more and 48 parts by mass or less, and particularly preferably 13 parts by mass or more and 48 parts by mass or less, per 100 parts by mass of the solid content of the composition R.

The fluororesin does not contain a siloxane linkage and at least part of the hydrogen of the alkyl chain of the fluororesin is substituted with fluorine. Examples of the fluororesin include perfluorooctyl acrylate and acrylic-modified perfluoropolyether. The fluororesin may have a (meth)acryloyl group partially substituted with fluorine.

Examples of commercial products of the fluororesin are shown below.

Manufactured by DIC Corporation: MEGAFAC RS-72-K, MEGAFAC RS-75, MEGAFAC RS-76-E, MEGAFAC RS-76-NS, and MEGAFAC RS-77
Manufactured by Daikin Industries, Ltd.: OPTOOL DAC-HP
Manufactured by Solvay Solexis, Inc.: FLUOROLINK MD 700 and FLUOROLINK AD 1700
Manufactured by NEOS Co., Ltd.: FTERGENT 601ADH2

The content of the fluororesin is preferably 0.1 parts by mass or more and 10 mass or less, more preferably 1 part by mass or more and 8 parts by mass or less, and particularly preferably 1.5 parts by mass or more and 7 parts by mass or less, per 100 parts by mass of the solid content of the composition R.

The content of the inorganic oxide fine particles is preferably 1 part by mass or more and 55 parts by mass or less, more preferably 10 parts by mass or more and 50 parts by mass or less, and particularly preferably 12 parts by mass or more and 40 parts by mass or less, per 100 parts by mass of the solid content of the composition R.

The composition R may comprise at least one selected from among a polyfunctional (meth)acrylate compound, a polyfunctional urethane (meth)acrylate compound, and a polyfunctional silicon (meth)acrylate compound. Thanks to this, the cured optical interference layer has a high cross-linking density, and thus has superior hard coating performance. In addition, the transparency of the cured optical interference layer is easily improved. As the polyfunctional (meth)acrylate compound, the polyfunctional urethane (meth)acrylate compound, and the polyfunctional silicon (meth)acrylate compound, for example, those shown as examples for the composition HC can be selected.

The composition R may comprise at least one selected from the group consisting of a reactive acrylic resin, a non-reactive acrylic resin, a polyfunctional urethane acrylate monomer and/or oligomer, a polyfunctional silicon (meth)acrylate monomer and/or oligomer containing a fluorine atom, a fluororesin, and inorganic oxide fine particles.

The composition R may comprise a reactive acrylic resin and/or a non-reactive acrylic resin, and at least one selected from the group consisting of a polyfunctional urethane acrylate monomer and/or oligomer, a polyfunctional silicon (meth)acrylate monomer and/or oligomer containing a fluorine atom, a fluororesin, and inorganic oxide fine particles.

<Photopolymerization Initiator>

The composition R preferably comprises a photopolymerization initiator. Thanks to this, polymerization of the active energy ray-curable resin component easily proceeds. As the photopolymerization initiator, for example, those disclosed as examples for the composition HC can be chosen.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The amount of the photopolymerization initiator is preferably 0.01 parts by mass or more and 10 parts by mass or less, and more preferably 1 part by mass or more and 10 parts by mass or less, per 100 parts by mass of the solid content of the composition R.

<Solvent>

The composition R may contain a solvent. The solvent is not particularly limited, and is appropriately selected in consideration of the components contained in the composition, the type of the transparent support substrate, the application method, etc. As the solvent, those disclosed as examples for the composition HC can be chosen. Among them, ester solvents, ether solvents, alcohol solvents, and ketone solvents are preferable.

<Refractive Index Lowering Component>

The composition R for forming the low refractive index layer preferably contains a refractive index lowering component that lowers the refractive index of the cured optical interference layer. The refractive index lowering component is, for example, particulate (hereinafter, the refractive index lowering particles may be referred to as refractive index lowering particles).

Examples of the refractive index lowering component include hollow silica fine particles. The hollow silica fine particles play a role of lowering the refractive index of the optical interference layer while maintaining the strength of the layer. The hollow silica fine particles are of a structure in which the inside thereof is filled with a gas and/or a porous structure containing a gas. The refractive index is lowered in inverse proportion to the occupancy of the gas. Thus, the hollow silica fine particles have a lower refractive index than the original refractive index of the silica fine particles. Examples of the hollow silica fine particles include THRULYA 4320 (manufactured by JGC Catalysts and Chemicals Ltd.).

As the refractive index lowering component, silica fine particles in which a nanoporous structure is formed on at least part of the inside and/or the surface may be used. The nanoporous structure is formed according to the form, structure, and aggregation state of the silica fine particles and the dispersion state inside the coating film of the silica fine particles.

The average particle diameter of the refractive index lowering particles is preferably 60 nm or more and 200 nm or less. The average particle diameter is a primary particle diameter.

The content of the refractive index lowering component is preferably 35 parts by mass or more and 70 parts by mass or less, and more preferably 37.5 parts by mass or more and 60 parts by mass or less, per 100 parts by mass of the solid content of the composition R. Thanks to this, the cured optical interference layer easily exhibits superior anti-reflection property.

The resin components of the composition HC and the composition R may be the same or different. Among them, both resin components are preferably the same or the same type. This is because adhesion between the uncured hard coat layer and the uncured optical interference layer is improved, and delamination between the layers hardly occurs.

[Uncured Functional Layer]

The laminated film may further have at least one uncured functional layer between the uncured hard coat layer and the uncured optical interference layer. The functional layer reinforces the optical function of the laminated film or imparts a new optical function.

The functional layer may be another optical interference layer having optical characteristics different from those of the above-described optical interference layer. The functional layer may be a combination of two or more other optical interference layers having characteristics different from those of the optical interference layer.

When the optical interference layer has a low refractive index, a preferable functional layer is, for example, at least one of a optical interference layer having a high refractive index and a optical interference layer having a medium refractive index.

The refractive index of the other optical interference layer is not particularly limited. The thickness of the other optical interference layer may be 10 nm or more and 300 nm or less. The thickness of each of the optical interference layers is preferably 15 nm or more, more preferably 40 nm or more, and particularly preferably 60 nm or more. The thickness of each of the optical interference layers is preferably 200 nm or less, more preferably 180 nm or less, and particularly preferably 150 nm or less.

The composition for forming a functional layer may comprise the same components as those contained in the composition HC or the composition R described above. The composition for forming the other optical interference layer may comprise the same components as those contained in the composition R. The components contained in the plurality of optical interference layers may be the same or different. The resin components contained in the plurality of optical interference layers may be the same or different.

The high refractive index layer and the medium refractive index layer may comprise a resin component other than the active energy ray-curable type. Examples of the other resin components include thermoplastic resins such as alkyd resins, polyester resins, and acrylic resins; thermosetting resins such as epoxy resins, phenol resins, melamine resins, urethane resins, and silicon resins; and polyisocyanates.

[Protective Film]

The laminated film may have a protective film on a surface of the uncured optical interference layer on a side opposite from the uncured hard coat layer.

The protective film protects the optical interference layer and the laminated film, and functions as a release paper for forming the composition R into a film form. The protective film may have an adhesive layer on the application surface.

Protective films known in the art are used without particular limitation. The protective film may be either colorless or colored. The protective film may be transparent.

The thickness of the protective film is not particularly limited. The thickness of the protective film may be 20 μm or more and 100 μm or less. Thanks to this, the effect of protecting the uncured optical interference layer is easily enhanced. The thickness of the protective film is preferably 25 μm or more, more preferably 30 μm or more, even more preferably 33 μm or more, and particularly preferably 35 μm or more. The thickness of the protective film is preferably 85 μm or less, more preferably 80 μm or less, and even more preferably 65 μm or less. The thickness of the protective film is a value that does not include the thickness of the adhesive layer.

The protective film is made of, for example, resin. Examples of the resin film include polyolefin films such as polyethylene films and polypropylene films (including an unoriented polypropylene film (CPP film) and a biaxially oriented polypropylene film (OPP film)), modified polyolefin films obtained by modifying these polyolefins to add further functions, polyester films such as polyethylene terephthalate, polycarbonate and polylactic acid, polystyrene resin films such as polystyrene films, AS resin films and ABS resin films, nylon films, polyamide films, polyvinyl chloride films and polyvinylidene chloride films, and polymethylpentene films.

Additives such as an antistatic agent and an ultraviolet inhibitor may be added to the resin film, as necessary. The surface of the resin film may have been subjected to corona treatment or low-temperature plasma treatment.

Among them, at least one selected from among a polyethylene film, a polystyrene film, a modified polyolefin film, a polymethylpentene film, an OPP film, and a CPP film is preferable.

In particular, at least one selected from among a polyethylene film, a polystyrene film, a modified polyolefin film, a polymethylpentene film, an OPP film, and a CPP film each having a thickness of 30 μm or more and 100 μm or less is preferable.

B. Laminated Member

The laminated member according to the present embodiment is obtained by curing the laminated film. The laminated member is a completely cured product of the laminated film. The laminated member includes a transparent support substrate, a cured hard coat layer, and a cured optical interference layer in this order. The laminated member may further have at least one cured functional layer between the cured hard coat layer and the cured optical interference layer. The laminated member may or may not further have a protective film. The protective film is used depending on the intended purpose of use.

The laminated member is obtained, for example, by irradiating the laminated film with an active energy ray to cure the uncured hard coat layer and the uncured optical interference layer.

The laminated member is particularly suitable as a protective material for a display and various sensors disposed around the display. Examples of the display include a liquid crystal display, an organic EL display, and a plasma display. The laminated member is particularly suitable as a protective material for a touch panel display for vehicles and devices disposed around the display. The laminated member is disposed such that the optical interference layer is outside the hard coat layer.

[Decorative Layer]

The laminated member may further have a decorative layer. The laminated member includes, for example, a transparent support substrate, a hard coat layer and a optical interference layer disposed on one main surface of the transparent support substrate, and a decorative layer disposed on the other main surface of the transparent support substrate. The decorative layer may be provided on a part of the other main surface of the transparent support substrate. The decorative layer is a layer that provides decoration, such as a pattern, characters, or metallic luster to the laminated member. The decorative layer enhances the designability of the laminated member.

Examples of the decorative layer include at least one of a print layer and a vapor-deposited layer. Each of the print layer and the vapor-deposited layer has one or more layers, and may include a plurality of layers. The thickness of the decorative layer is not particularly limited, and is appropriately set according to designability, etc.

In the print layer, for example, a wood grain pattern, a stone grain pattern, a cloth grain pattern, a sand grain pattern, a geometric pattern, characters, or a solid print is drawn. The print layer is formed of, for example, a coloring ink comprising a binder resin and a colorant. The binder resin is not particularly limited. Examples of the binder resin include polyvinyl-based resins such as vinyl chloride/vinyl acetate-based copolymers, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins.

The colorant is not particularly limited, and examples thereof include known pigments and dyes. Examples of a yellow pigment include azo-based pigments such as polyazo pigments, organic pigments such as isoindolinone, and inorganic pigments such as titanium nickel antimony oxide. Examples of a red pigment include azo-based pigments such as polyazo pigments, organic pigments such as quinacridone, and inorganic pigments such as rouge. Examples of a blue pigment include organic pigments such as phthalocyanine blue and inorganic pigments such as cobalt blue. Examples of a black pigment include organic pigments such as aniline black. Examples of a white pigment include inorganic pigments such as titanium dioxide.

The vapor-deposited layer is formed of at least one metal selected from the group comprising aluminum, nickel, gold, platinum, chromium, iron, copper, indium, tin, silver, titanium, lead and zinc or an alloy or compound thereof.

[Molded Resin Layer]

The laminated member may further have a molded resin layer. The molded resin layer supports the hard coat layer and the optical interference layer together with the transparent support substrate. The laminated member includes, for example, a transparent support substrate, a hard coat layer and an optical interference layer disposed on one main surface of the transparent support substrate, and a molded resin layer disposed on the other main surface of the transparent support substrate. The shape of the molded resin layer is not limited. Thus, the degree of freedom of the design of the laminated member is increased.

The resin that forms the molded resin layer is not particularly limited. The molded resin layer comprises, for example, a thermosetting resin and/or a thermoplastic resin. Examples of the thermosetting resin include phenol resin, epoxy resin, melamine resin, urea resin, unsaturated polyester, and thermosetting polyimide. Examples of the thermoplastic resin include so-called engineering plastics. Examples of the engineering plastics include polyamide, polyacetal, polycarbonate, ultra-high molecular weight polyethylene, polysulfone, polyether sulfone, polyphenylene sulfide, and liquid crystal polymer.

The laminated member may comprise a transparent support substrate, a hard coat layer and an optical interference layer disposed on one main surface of the transparent support substrate, a decorative layer disposed on the other main surface of the transparent support substrate, and a molded resin layer. In this case, the decorative layer is disposed so as to be sandwiched between the transparent support substrate and the molded resin layer.

[Method for Manufacturing Laminated Member]

The laminated member according to the present embodiment is manufactured by, for example, a method comprising a step of preparing the laminated film, and a step of irradiating the laminated film with an active energy ray. After the step of preparing the laminated film, a decoration step, a preform step, and a main molding step are performed as necessary. The decoration step is preferably performed before the preform step.

The step of irradiating with an active energy ray may be performed a plurality of times. For example, after the decoration step and/or the preform step, semi-curing, namely, irradiating part of the laminated film with an active energy ray may be performed. In this case, after the main molding step, a main curing step of irradiating the laminated film with an active energy ray so as to cure the remaining part is performed.

The type of the active energy ray is not particularly limited. The active energy ray is appropriately selected according to the type of the resin component contained in the layer-forming composition. The active energy ray is not particularly limited, and may be an ionizing radiation such as ultraviolet ray, electron beam, α ray, β ray, and γ ray. Among them, ultraviolet rays having a wavelength of 380 nm or less are preferable. Ultraviolet ray is irradiated using, for example, a high-pressure mercury lamp or an ultra-high-pressure mercury lamp.

(1) Step of Preparing Laminated Film

A laminated film is prepared. The laminated film has a transparent support substrate, an uncured hard coat layer formed on at least one surface of the transparent support substrate, and an uncured optical interference layer formed on the uncured hard coat layer.

The laminated film is manufactured by a method comprising a step of forming an uncured hard coat layer on at least one surface of a transparent support substrate, and a step of laminating an uncured optical interference layer on the uncured hard coat layer.

(1-1) Step of Forming Uncured Hard Coat Layer

The method for forming the uncured hard coat layer is not particularly limited. The uncured hard coat layer is formed by, for example, applying the composition HC to at least one surface of the transparent support substrate. After the application, a drying step may be performed. The drying conditions are not particularly limited, and are appropriately set such that at least part of the solvent contained in the composition HC is removed.

The composition HC can be prepared by a method commonly practiced by one skilled in the art. For example, it can be prepared by mixing the above-described components by using a commonly used mixing device such as a paint shaker and a mixer.

The method of the application of the composition HC is not particularly limited, and the application is performed by a method usually performed by one skilled in the art. Examples of the application method include a dip coating method, an air knife coating method, a curtain coating method, a roller coating method, a bar coating method (e.g., a wire bar coating method), a die coating method, an inkjet method, a gravure coating method, or an extrusion coating method (U.S. Pat. No. 2,681,294).

(1-2) Step of Laminating Uncured Hard Coat Layer and Uncured Optical Interference Layer The method for laminating the uncured hard coat layer and the uncured optical interference layer is not particularly limited, and may be a coating method or a lamination method.

In the coating method, the uncured optical interference layer is laminated by applying the composition R to the uncured hard coat layer. After the application, a drying step may be performed. The drying conditions are not particularly limited, and are appropriately set such that at least part of the solvent contained in the composition R is removed.

The other composition for forming a functional layer is applied to the uncured hard coat layer by the above-described method before applying the composition R to the uncured hard coat layer. As a result, a laminated film in which another uncured functional layer is disposed between the uncured hard coat layer and the uncured optical interference layer is obtained. The composition for forming a functional layer and the compositions R can be prepared by the above methods.

In the lamination method, an uncured optical interference layer formed on another supporting substrate (typically, the protective film described above) and an uncured hard coat layer formed on a transparent supporting substrate are bonded. In this case, mixing of phases of the uncured hard coat layer and the uncured optical interference layer is particularly easily suppressed.

The uncured optical interference layer is formed by applying the composition R to another supporting substrate. The method for applying the composition R is performed by a technique that is usually performed by one skilled in the art, similarly to the composition HC. After the application, a drying step may be performed. After both layers are bonded, the other supporting substrate may be peeled off.

The other functional layer may also be laminated by bonding.

The other functional layer is bonded by, for example, the following steps. The other support substrate is peeled off from the laminate including the transparent support substrate, the uncured hard coat layer, the uncured optical interference layer (a first optical interference layer), and the other support substrate in this order obtained by the lamination step, and thus, the uncured optical interference layer is exposed. Separately, another uncured functional layer is formed on a new support substrate. Then, the uncured functional layer supported by the new support substrate is bonded to the exposed uncured optical interference layer. These steps may be repeated as necessary.

(2) Decoration Step

When the hard coat layer is disposed on one main surface of the transparent support substrate, the above-described decorative layer may be formed on the other main surface of the transparent support substrate before a molding step. The decoration step may be performed before the preparation step or may be performed after the preparation step. From the viewpoint of productivity, the decoration step is desirably performed after the preparation step.

The method for forming the print layer is not particularly limited. Examples of the method for forming the print layer include an offset printing method, a gravure printing method, a screen printing method, a roll coating method, and a spray coating method. The method for forming the vapor-deposited layer is also not particularly limited. Examples of the method for forming the vapor-deposited layer include a vacuum vapor deposition method, a sputtering method, an ion plating method, and a plating method.

(3) Preform Step

In the case of manufacturing a laminated member having a three-dimensional shape, the laminated film may be molded into a shape conforming to a desired three-dimensional shape after the preparation step (further, the decoration step) and before the main molding step. By molding the laminated film into a shape close to a three-dimensional shape in advance, the occurrence of cracks, wrinkles, etc. when the laminated film is then molded into a three-dimensional shape is more easily suppressed. After the preform step, a trimming step of removing unnecessary parts of the laminated film may be performed.

The method of preform is not particularly limited. The preform is performed by, for example, a vacuum molding method, an air-pressure molding method, or a vacuum air-pressure molding method. In the preform, the mold and the laminated film are placed in the same processing chamber. The laminated film is placed such that the transparent support substrate faces the mold. The laminated film is heated and the processing chamber is brought into a vacuum state and/or a pressurized state. Thanks to this, the laminated film is deformed along the mold. Next, the laminated film is cooled and then removed from the mold.

In the preform, the laminated film may be heat-treated at a temperature of 90° C. or more and 150° C. or less. Since the laminated film according to the present embodiment is hardly cured by heat treatment, the stretch ratio is hardly reduced and the surface of each layer can be smoothened.

(4) Semi-Curing Step

Before the main molding step, an active energy ray may be applied such that the laminated film is partly cured. Thanks to this, a semi-cured laminated film is obtained.

The semi-curing step is usually performed after the preform. By the semi-curing step, the stretch ratio required in the preform step and/or the main molding step can be obtained. The integral light quantity of the active energy ray is, for example, 1 mJ/cm$^2$ or more and less than 100 mJ/cm$^2$. After the semi-curing step, a trimming step of removing unnecessary parts of the laminated film may be performed.

(5) Main Molding Step

In a main molding step, for example, insert molding is performed. In the insert molding method, for example, the optical interference layer is made to face a mold and a resin for molding is injected against the transparent support substrate. Thanks to this, the laminated film is shaped into a three-dimensional shape, and a molded resin layer is formed on the other main surface of the transparent support substrate.

(6) Main Curing Step

The laminated film is irradiated with an active energy ray and the laminated film is thereby completely cured. Thanks to this, a laminated member is obtained. The integral light quantity of the active energy ray is, for example, 100 mJ/cm$^2$ or more. The integral light quantity of the active energy ray may be 5000 mJ/cm$^2$ or less, and may be 3000 mJ/cm$^2$ or less. The active energy ray may be of the same type as or different from that of the semi-curing step.

The embodiments described above are examples, and known treatments, processing steps, etc. may be introduced as desired.

EXAMPLES

The present invention will be described hereafter in more detail by way of examples, to which the present invention is not intended to be limited. In the examples, "parts" and "%" are on a mass basis unless otherwise indicated.

The components used in the examples and comparative examples in the present description are as follows.
(Reactive Acrylic Resin)

(1) Product name: KRM-9322, manufactured by Daicel-Allnex Ltd., Tg: 60° C., Mw: 50,000

(2) Product name: WEL-355, manufactured by DIC Corporation, Tg: 85° C., Mw: 45,000
(Polyfunctional Urethane Acrylate Oligomer)

Product name: KRM-8452, manufactured by Daicel-Allnex Ltd., Mw: 3884, acrylate equivalent: 120 g/eq
(Polyfunctional Silicon Acrylate Oligomer Containing Fluorine Atom)

Product name: Shikoh UV-AF305, manufactured by Mitsubishi Chemical Corporation, Mw: 18000
(Polyfunctional Urethane Acrylate Oligomer)

Product name: H-7M40, manufactured by Negami Chemical Industrial Co., Ltd., Mw: 10000 to 15000

(Polyfunctional urethane acrylate oligomer)

Product name: CN-9893, manufactured by Arkema S.A.
(Polyfunctional Acrylate Oligomer)

Product name: ARONIX M-315, manufactured by Toagosei Co., Ltd., Mw: 450, acrylate equivalent: 150 g/eq
(Refractive Index Lowering Component)

Product name: THRULYA 4320 (produced by JGC Catalysts and Chemicals Ltd., hollow silica fine particles)
(Inorganic Oxide Fine Particle)

(1) Product name: OSCAL 1842, manufactured by JGC Catalysts and Chemicals Ltd., particle diameter: 10 nm, reactive silica organosol (2) Product name: HX-204 IP, manufactured by Nissan Chemical Corporation, phosphorus-doped tin oxide sol, particle diameter: 5 nm to 20 nm
(Photopolymerization Initiator)

Product name: Omnirad 184, manufactured by IGM RESINS, α-hydroxyalkylphenone
(Transparent Support Substrate)

(1) TB1 to TB4: product name AW-10U, manufactured by Wavelock Advanced Technology Co., Ltd., two-layer (PMMA/PC) film made of PMMA and PC, TB1: 300 μm in thickness, TB2: 200 μm in thickness, TB3: 500 μm in thickness, TB4: 800 μm in thickness, TB5: 100 μm in thickness (Protective Film)

Product name: TORAYFAN #40-2500, manufactured by Toray Industries, Inc., biaxially oriented polypropylene film (OPP), thickness: 40 μm
[Preparation of Composition HC1]

In a container containing 185 parts of methyl isobutyl ketone were mixed 47.6 parts by mass of KRM-9322 (reactive acrylic resin), 33.3 parts by mass of KRM-8452 (polyfunctional urethane acrylate oligomer), 14.3 parts by mass of OSCAL 1842 (inorganic oxide fine particles), and 4.8 parts by mass of Omnirad 184 (photopolymerization initiation). Thus, a transparent composition HC1 having a solid concentration of 35% was prepared.
[Preparation of Compositions HC2 to HC6]

Transparent compositions HC2 to HC6 each having a solid concentration of 35% were prepared in the same manner as for the composition HC1 except for using the formulations shown in Table 1C.
[Preparation of Composition LR1]

To a container containing 1203 parts of propylene glycol monomethyl ether were mixed 24.8 parts by mass of KRM-9322 (reactive acrylic resin), 13.3 parts by mass of KRM-8452 (polyfunctional urethane acrylate oligomer), 13.3 parts by mass of Shikoh UV-AF305 (polyfunctional silicon acrylate oligomer containing a fluorine atom), and 4.8 parts by mass of Omnirad 184 (photopolymerization initiation). Furthermore, 43.8 parts by mass of THRULYA 4320 (refractive index lowering component) was blended. Thus, a transparent composition LR1 having a resin solid concentration of 3.0% was prepared.
[Preparation of Compositions LR2 to LR5]

Transparent compositions LR2 to LR5 each having a solid concentration of 35% were prepared in the same manner as for the composition LR1 except for using the formulations shown in Table 1A.
[Preparation of Other Compositions HR1 and MR1 for Forming a Functional Layer]

Transparent other compositions HR1 and MR1 for forming a functional layer each having a solid concentration of 35% were prepared in the same manner as for the composition LR1 except for using the formulations shown in Table 1B.

Example 1

(1) Manufacture of Laminated Film
(1-1) Formation of Uncured Hard Coat Layer

The composition HC1 was applied to the PMMA surface of the transparent support substrate TB1 with a gravure coater such that the thickness after drying was 8 μm. Then, the resultant was dried at 80° C. for 1 minute to volatilize the solvent, thereby forming an uncured hard coat layer.

The surface of the obtained uncured hard coat layer was subjected to a touch test, and then its appearance was observed. There was no change in the outward appearance of the surface of the uncured hard coat layer, and the uncured hard coat layer was evaluated to be tack-free.

Hereinafter, a hard coat layer may be referred to as an "HC layer".

(1-2) Formation of Uncured Optical Interference Layer

The composition LR1 was applied to an OPP film (protective film) with a gravure coater such that the thickness after drying was 95 nm. Then, the resultant was dried at 80° C. for 1 minute to volatilize the solvent, thereby forming an uncured optical interference layer. The surface of the resultant uncured optical interference layer was also tack-free. The protective film on which the uncured optical interference layer was formed was wound into a roll form.

Hereinafter, an optical interference layer formed of the composition LR1 having a low refractive index may be referred to as an "LR layer".

(1-3) Lamination of Uncured HC Layer and LR Layer

While the protective film wound in a roll form was unwound, the surface of the uncured HC layer supported by the transparent support substrate TB1 and the uncured LR surface supported by the protective film were bonded to each other. Thus, a laminated film including the transparent support substrate, the uncured HC layer, the uncured LR layer, and the protective film in this order was manufactured.

(2) Manufacture of Laminated Member (2-1) Formation of Print Layer

A print layer was formed on a surface of the transparent support substrate of the laminated film on the side opposite from the uncured HC layer by screen printing, and dried at a drying temperature of 80° C. for 10 minutes. This printing step was repeated 5 times, and then the resultant was dried at 90° C. for 1 hour. A black paint (product name: CZ-805 BLACK (manufactured by NIKKO BICS Co., Ltd.) was used for the formation of the print layer.

(2-2) Peeling of Protective Film

The protective film was then peeled off from the uncured LR layer at a rate of 5.0 mm/sec.

(2-3) Preform

The laminated film with the print layer was heated at 190° C. for 30 seconds, and preform was performed by a vacuum pressure molding method.

(2-4) Main Curing

The preformed laminated film was irradiated with an active energy ray having an integral light quantity of 500 mJ/cm$^2$. Subsequently, trimming was performed.

(2-5) Main Molding

Finally, injection molding was performed, so that a laminated member having a molded resin layer (polycarbonate) on the print layer side of the transparent support substrate. In the examples, unless otherwise specified, ultraviolet rays are used as active energy rays.

[Evaluation]

The laminated film and the laminated member were evaluated as follows.

(a) Refractive Index

Compositions LR1 to LR5 and compositions HR1 and MR1 were applied to protective films, respectively, to achieve a dry thickness of 5 μm. Subsequently, the coating film was irradiated with an active energy ray having an integral light quantity of 500 mJ/cm$^2$ to afford an evaluation sample. The refractive index of the evaluation sample at a D line of 589 nm was measured using an Abbe refractometer DR-M2 manufactured by Atago Co., Ltd. The evaluation sample was set on the prism surface, and 1-bromonaphthalene was used as the intermediate solution.

(b) Thickness

An evaluation sample of 10 mm×10 mm was cut out from a laminated member. A cross section of the evaluation sample was exposed with a microtome (LEICA RM2265). The exposed cross section was observed with a laser microscope (VK8700, manufactured by KEYENCE Corporation) or a transmission electron microscope (JEM2100, manufactured by JEOL Ltd.), and the thickness of each 10 points of the HC layer, and the LR layer was measured. The average values were taken as the thickness of the HC layer and the thickness of the LR layer, respectively.

(c) Luminous Reflectance

A black paint (product name: CZ-805 BLACK (manufactured by NIKKO BICS Co., Ltd.) was applied to a surface of the transparent support substrate of the laminated film opposite from the uncured HC layer with a bar coater such that a dry film thickness was 3 μm or more and 6 μm or less. Subsequently, the laminated film coated with the black paint was allowed to stand in a room temperature environment for 5 hours and dried to prepare an uncured evaluation sample.

From the optical interference layer side of the evaluation sample, a luminous reflectance by the SCI method was measured. For the measurement, SD7000 manufactured by Nippon Denshoku Industries Co., Ltd. was used, and the measurement wavelength region was set to 380 nm or more and 780 nm or less.

(d) Stretch Ratio

A test piece having a length of 200 mm×a width of 10 mm was cut out from a laminated film. The test piece was set in a tensile tester having a distance between chucks of 150 mm, and the long side of the evaluation sample was stretched by 50% under the conditions of a tensile force of 5.0 Kgf and a tensile speed of 300 mm/min in a 160° C. atmosphere. The evaluation sample after stretching was observed using a microscope with a magnification of 1000 times or more, and the presence of cracks having a size exceeding 100 μm in length and 1 μm in width was checked.

When no crack occurred, a new evaluation sample was cut out, and then the long side was stretched by 60%. Then, occurrence of cracks was observed in the same procedure. This procedure was repeated while increasing the stretch ratio by 10%. The stretch ratio applied when a crack of the above size was first confirmed was taken as the stretch ratio of the laminated film. The evaluation was performed three times for the evaluation samples cut out from the same laminated film, and the average value of the stretch ratios obtained in each time was taken as the stretch ratio of the laminated film.

(e) Coating Film Hardness

The hardness was measured from the uncured LR layer side of the laminated film and the LR layer side of the laminated member.

The hardness was measured by continuous stiffness measurement (method used: Advanced Dynamic E and H.NMT) using iMicro Nanoindenter manufactured by NANOMECHANICS, INC.

Specifically, a minute AC load was superimposed on a quasi-static test load on the surface of the evaluation sample. The load was applied until it reached a maximum load of 50 mN. As an indenter, a berkovich type diamond indenter (tip curvature radius: 20 nm) was used. Continuous stiffness with respect to depth was calculated from the vibration component of the resulting displacement and the phase difference between the displacement and the load, and the profile of hardness with respect to depth was obtained. The maximum hardness at a depth of 50 nm to 100 nm of this profile was calculated.

iMicro-dedicated software was used to calculate the load and stiffness. In calculating the stiffness, the Poisson's ratio of the coating layer was set to 0.35. The load was controlled such that the strain rate $(\partial P/\partial t)/P$ was 0.2. In the analysis with the iMicro-dedicated software, a point provisionally defined on the iMicro-dedicated software at the time of measurement (a point at which d(Force)/d(Disp) was approximately 500 N/m) was set as the surface position of the coating layer.

(f) Handleability after Preform

The preformed laminated film was irradiated with an active energy ray having an integral light quantity of 500 mJ/cm$^2$ to obtain an evaluation sample. The handleability when setting the evaluation sample in a mold for injection molding was evaluated.

Evaluation criteria are as follows.

Good: The evaluation sample has stiffness, and can be easily placed in an injection molding mold.

Fair: The stiffness of the evaluation sample is weak, and there is some difficulty in handling, but it can be placed in a mold.

Poor: The stiffness of the evaluation sample is weak, and the evaluation sample cannot be placed in a mold.

(g) Warpage of Laminated Member

An evaluation sample of 200 mm×200 mm was cut out from the laminated film and irradiated with an active energy ray having an integral light quantity of 500 mJ/cm$^2$. Subsequently, the evaluation sample was placed on a horizontal plane, and the amount of lifting (amount of warpage) of the four corners from the horizontal plane was measured using a ruler and averaged.

Evaluation criteria are as follows.
Excellent: The average amount of warpage is 10 mm or less.
Good: The average amount of warpage is 10 mm or more and less than 15 mm.
Fair: The average amount of warpage is 15 mm or more and less than 20 mm.
Poor: The average amount of warpage is 20 mm or more.
(h) Outward Appearance after Printing Step The laminated film after peeling off the protective film (2-2) and before the preform (2-3) was used as an evaluation sample. The presence of squeegee marks and suction marks due to the printing process of the evaluation sample was visually checked.

Evaluation criteria are as follows.
Excellent: There are no squeegee marks and no suction marks.
Good: There are slight squeegee marks and suction marks, but they are leveled and disappeared by heating to 90° C. or more.
Fair: There are slight squeegee marks and suction marks, but they are leveled and disappeared by heating to 150° C. or more.
Bad: There are squeegee marks and suction marks.
(i) Bonding Property Between Uncured HC Layer and LR Layer The laminated film having the transparent support substrate and the uncured hard coat layer and the laminated film having the protective film and the uncured optical interference layer were bonded to each other while being pressed with a hand roller such that the layers faced each other, and the degree of bonding was evaluated.

Evaluation criteria are as follows.
Good: The films are bonded to each other.
Fair: The films are bonded to each other, but adhesion is weak.
Poor: The films are not bonded to each other at all.
(j) Pencil Hardness The pencil hardness of the LR layer of the laminated member was evaluated.

Pencil hardness was measured according to JIS K5600-5-4 (1999), Scratch Hardness (the pencil method).
(k) Abrasion Resistance The surface of the LR layer of the laminated member was rubbed 5000 times with a friction element to which a cotton cloth was fixed while applying a vertical load of 4.9 N. The surface of the LR layer of the laminated member was visually observed. Subsequently, the surface of the LR layer of the laminated member was rubbed until the number of integrations reached 7000. The surface of the LR layer of the laminated member was visually observed. Evaluation criteria are as follows.

Excellent: No scratches were visually recognized even after 7000 rubs.
Good: No scratches were visually recognized after 5000 rubs, but scratches were visually recognized after 7000 rubs.
Fair: After 5000 rubs, 5 or less scratches were visually recognized.
Poor: After 5000 rubs, many scratches were visually recognized.
(1) Chemical Resistance An evaluation sample of 10 cm×10 cm was cut out from a laminated member. Throughout one surface of the LR layer of the evaluation sample was applied 2 g of Neutrogena SUNSCREEN SPF 45 (manufactured by Johnson & Johnson) uniformly with a finger. Subsequently, the sample was warmed at 80° C. for 4 hours. Then, the sample was cooled to room temperature, washed with water, and the appearance of the LR layer was visually evaluated.

Evaluation criteria are as follows.
Excellent: No appearance abnormality was observed.
Good: Applied marks are recognized, but lifting is not recognized.
Fair: Slight lifting is recognized.
Poor: Severe lifting occurred.

Examples 2 to 17

In the same manner as in Example 1, laminated films and laminated members having the configurations shown in Table 2A and Table 2B were prepared using compositions prepared with the formulations shown in Table 1A, Table 1B, and Table 1C. The laminated films and the laminated members obtained were evaluated in the same manner as in Example 1. The results are shown in Tables 2A and 2B. In any of the examples, the surfaces of the uncured hard coat layer and the uncured optical interference layer obtained were tack-free.

Comparative Example 1

An uncured HC layer was formed on the transparent support substrate TB1 in the same manner as in Example 1 except that the composition HC4 was used. Next, the HC layer was irradiated with an active energy ray with an integral light quantity of 500 mJ/cm$^2$ and the HC layer was thereby cured.

The composition LR3 was applied to the cured HC layer. Subsequently, the composition LR3 was dried to form an LR layer having a dry thickness of 95 nm. Finally, an active energy ray having an integral light quantity of 500 mJ/cm$^2$ was applied to obtain a precure type laminated film. Using this laminated film, a laminated member was prepared and evaluated in the same manner as in Example 1. The results are shown in Table 3.

Comparative Example 2

A laminated film and a laminated member were prepared and evaluated in the same manner as in Example 1 except that an uncured LR layer was not formed. The results are shown in Table 3.

Comparative Example 3

A laminated film was obtained in the same manner as in Example 1 except that the composition LR4 was used instead of the composition LR1. Using this laminated film, a laminated member was prepared and evaluated in the same manner as in Example 1. The results are shown in Table 3.

Comparative Example 4

TB4 was prepared instead of the transparent support substrate TB1, and an uncured hard coat layer was formed in the same manner as in Example 1. However, since the transparent support substrate TB4 was excessively thick, the bonding between the uncured hard coat layer and the uncured optical interference layer was defective, so that a laminated film could not be prepared. Thus, a laminated member could not be prepared and evaluated.

Comparative Examples 5 to 6

Laminated films and laminated members were prepared and evaluated in the same manner as in Example 1 except that the thickness of the uncured optical interference layer was changed. The results are shown in Table 3.

TABLE 1A

|  |  |  | LR1 | LR2 | LR3 | LR4 | LR5 |
|---|---|---|---|---|---|---|---|
| Composition for forming a optical interference layer | Reactive acrylic resin | KRM-9322 | 24.8 | 27.9 |  | 40.0 |  |
|  | Reactive acrylic resin | WEL-355 |  |  |  |  | 24.8 |
|  | Polyfunctional urethane acrylate oligomer | KRM-8452 | 13.3 | 15.0 |  | 27.6 | 13.3 |
|  | Polyfunctional silicon acrylate oligomer containing fluorine atom | Shikoh UV-AF305 | 13.3 | 15.0 | 15.71 | 27.6 | 13.3 |
|  | Refractive index lowering component | THRULYA 4320 | 43.8 | 37.2 | 70.1 | 0.0 | 43.8 |
|  | Polyfunctional urethane acrylate oligomer | H-7M40 |  |  | 13.09 |  |  |
|  | Photopolymerization initiator | Omnirad 184 | 4.8 | 4.8 | 1.1 | 4.8 | 4.8 |
|  | Total |  | 100.0 | 100.0 | 100.0 | 100.0 | 100.0 |
|  | (a) Refractive index after curing |  | 1.37 | 1.39 | 1.30 | 1.51 | 1.37 |

TABLE 1B

|  |  |  | HR1 | MR1 |
|---|---|---|---|---|
| Other composition for forming a functional layer | Reactive acrylic resin | KRM-9322 | 8.9 | 35.7 |
|  | Polyfunctional urethane acrylate oligomer | KRM-8452 | 2.7 | 11.0 |
|  | Inorganic oxide fine particle | HX-204 1P | 86.5 | 51.5 |
|  | Photopolymerization initiator | Omnirad 184 | 1.8 | 1.8 |
|  | Total |  | 100.0 | 100.0 |
|  | (a) Refractive index after curing |  | 1.67 | 1.60 |

TABLE 1C

|  |  |  | HC1 | HC2 | HC3 | HC4 | HC5 |
|---|---|---|---|---|---|---|---|
| Composition for forming a hard coat layer | Reactive acrylic resin | KRM-9322 | 47.6 | 67.6 | 27.6 |  | 10.0 |
|  | Polyfunctional urethane acrylate oligomer | KRM-8452 | 33.3 | 13.3 | 53.3 |  | 70.9 |
|  | Inorganic oxide fine particle | OSCAL-1842 | 14.3 | 14.3 | 14.3 |  | 14.3 |
|  | Polyfunctional urethane acrylate oligomer | CN-9893 |  |  |  | 71.4 |  |
|  | Polyfunctional acrylate oligomer | M-315 |  |  |  | 23.8 |  |
|  | Photopolymerization initiator | Omnirad 184 | 4.8 | 4.8 | 4.8 | 4.8 | 4.8 |
|  | Total |  | 100.0 | 100.0 | 100.0 | 100.0 | 100.0 |

TABLE 2A

| Example |  |  | 1 | 2 | 3 | 4 | 5 | 6 | 7 | 8 | 9 | 10 |
|---|---|---|---|---|---|---|---|---|---|---|---|---|
| Laminated film | LR layer | No. | LR1 | LR1 | LR2 | LR1 | LR1 | LR1 | LR1 | LR1 | LR1 | LR1 |
|  |  | (b) Thickness (nm) | 95 | 95 | 95 | 95 | 95 | 70 | 170 | 95 | 95 | 95 |
|  | HR layer | No. | — | HR1 | — | — | — | — | — | — | — | — |
|  |  | (b) Thickness (nm) | — | 20 | — | — | — | — | — | — | — | — |
|  | MR layer | No. | — | — | — | — | — | — | — | — | — | — |
|  |  | (b) Thickness (nm) | — | — | — | — | — | — | — | — | — | — |
|  | Hard coat layer | No. | HC1 | HC1 | HC1 | HC1 | HC1 | HC1 | HC1 | HC1 | HC1 | HC3 |
|  |  | (b) Thickness (μm) | 8 | 8 | 8 | 8 | 8 | 8 | 8 | 3 | 23 | 8 |
|  | Transparent support substrate |  | TB1 | TB1 | TB1 | TB2 | TB3 | TB1 | TB1 | TB1 | TB1 | TB1 |
| Evaluation item | (c) Luminous reflectance (%) |  | 2.0 | 0.6 | 3.79 | 2.4 | 2.4 | 2.6 | 3.7 | 2.4 | 2.4 | 2.5 |
|  | (d) Stretch ratio (%) |  | ≥50 | ≥50 | ≥50 | ≥50 | ≥50 | ≥50 | ≥50 | ≥50 | ≥50 | ≥50 |
|  | (e) Coating film Hardness (Gpa) | Uncured | 0.3 | 0.3 | 0.2 | 0.3 | 0.3 | 0.3 | 0.3 | 0.3 | 0.3 | 0.2 |
|  |  | Cured | 0.8 | 0.8 | 0.8 | 0.8 | 0.8 | 0.8 | 0.8 | 0.8 | 1.0 | 1.0 |
|  | (f) Handleability after preforming |  | Good | Good | Good | Good | Good | Good | Good | Good | Good | Good |
|  | (g) Warpage of laminated member |  | Excellent | Excellent | Excellent | Excellent | Excellent | Excellent | Excellent | Excellent | Good | Excellent |
|  | (h) Appearance after printing step |  | Excellent | Excellent | Excellent | Excellent | Excellent | Excellent | Excellent | Excellent | Excellent | Good |

TABLE 2A-continued

| Example | | 1 | 2 | 3 | 4 | 5 | 6 | 7 | 8 | 9 | 10 |
|---|---|---|---|---|---|---|---|---|---|---|---|
| | (i) Bonding property | Good | Good | Good | Good | Good | Good | Good | Good | Good | Good |
| | (j) Pencil hardness | 2H | 2H | 2H | 2H | 3H | 2H | 2H | H | 3H | 3H |
| | (k) Abrasion resistance | Good | Good | Good | Good | Good | Good | Good | Good | Good | Good |
| | (l) Chemical resistance | Good | Good | Good | Good | Good | Good | Good | Good | Good | Good |

TABLE 2B

| | Example | | 11 | 12 | 13 | 14 | 15 | 16 | 17 |
|---|---|---|---|---|---|---|---|---|---|
| Laminated film | LR layer | No. | LR1 | LR1 | LR1 | LR1 | LR1 | LR1 | LR5 |
| | | (b) Thickness (nm) | 95 | 95 | 95 | 95 | 95 | 100 | 95 |
| | HR layer | No. | — | — | — | — | — | — | — |
| | | (b) Thickness (nm) | — | — | — | — | — | — | — |
| | MR layer | No. | — | MR1 | — | — | — | — | — |
| | | (b) Thickness (nm) | — | 110 | — | — | — | — | — |
| | Hard coat layer | No. | HC2 | HC1 | HC1 | HC1 | HC1 | HC5 | HC1 |
| | | (b) Thickness (μm) | 8 | 8 | 8 | 1.5 | 35 | 8 | 8 |
| | Transparent support substrate | | TB1 | TB1 | TB5 | TB1 | TB1 | TB1 | TB1 |
| Evaluation item | (c) Luminous reflectance (%) | | 2.4 | 1.3 | 2.4 | 2.4 | 2.4 | 2.4 | 2.4 |
| | (d) Stretch ratio (%) | | ≥50 | ≥50 | ≥50 | ≥50 | ≥50 | ≥50 | ≥50 |
| | (e) Coating film Uncured | | 0.4 | 0.3 | 0.3 | 0.3 | 0.3 | 0.05 | 0.3 |
| | Hardness (Gpa) Cured | | 0.6 | 0.8 | 0.8 | 0.8 | 0.8 | 1.0 | 0.8 |
| | (f) Handleability after preforming | | Good | Good | Fair | Good | Good | Good | Good |
| | (g) Warpage of laminated member | | Excellent | Excellent | Good | Excellent | Fair | Excellent | Good |
| | (h) Appearance after printing step | | Excellent | Excellent | Good | Good | Good | Fair | Good |
| | (i) Bonding property | | Good | Good | Good | Good | Good | Good | Good |
| | (j) Pencil hardness | | H | 2H | H | F | 4H | 3H | 2H |
| | (k) Abrasion resistance | | Good | Good | Good | Good | Good | Good | Good |
| | (l) Chemical resistance | | Good | Good | Good | Good | Good | Good | Good |

TABLE 3

| | Comparative Example | | 1 | 2 | 3 | 4 | 5 | 6 |
|---|---|---|---|---|---|---|---|---|
| Laminated film | LR layer | No. | LR3 | — | LR4 | LR1 | LR1 | LR1 |
| | | (b) Thickness (nm) | 100 | — | 95 | 95 | 10 | 210 |
| | HR layer | No. | — | — | — | — | — | — |
| | | (b) Thickness (nm) | — | — | — | — | — | — |
| | MR layer | No. | — | — | — | — | — | — |
| | | (b) Thickness (nm) | — | — | — | — | — | — |
| | Hard coat layer | No. | HC4 | HC1 | HC1 | HC1 | HC1 | HC1 |
| | | (b) Thickness (μm) | 3 | 8 | 8 | 8 | 8 | 8 |
| | Transparent support substrate | | TB1 | TB1 | TB1 | TB4 | TB1 | TB1 |
| Evaluation item | (c) Luminous reflectance (%) | | 2.4 | 5 | 5.0 | — | 4.9 | 4.5 |
| | (d) Stretch ratio (%) | | ≥50 | ≥50 | ≥50 | — | ≥50 | ≥50 |
| | (e) Coating film Uncured | | — | 0.3 | 0.3 | — | 0.3 | 0.3 |
| | Hardness (Gpa) Cured | | 0.6 | 0.8 | 0.8 | — | 0.8 | 0.8 |
| | (f) Handleability after preforming | | Good | Good | Good | — | Good | Good |
| | (g) Warpage of laminated member | | Excellent | Good | Good | — | Good | Good |
| | (h) Appearance after printing step | | Excellent | Good | Good | — | Good | Good |
| | (i) Bonding property | | — | — | Good | — | Good | Good |
| | (j) Pencil hardness | | H | 2H | 2H | — | 2H | 2H |
| | (k) Abrasion resistance | | Poor | Good | Good | — | Good | Good |
| | (l) Chemical resistance | | Poor | Good | Good | — | Good | Good |

As can be seen from Tables 2A and 2B, the laminated film according to the present embodiment can be molded even into a complicated shape, and suppresses the occurrence of defective products during molding. In addition, the laminated member according to the present embodiment has superior hard coat performance (for example, high hardness, abrasion resistance, and chemical resistance), and superior antireflection properties.

The laminated film of Comparative Example 1 is of a precure type. Thus, each layer is constituted of a composition so as to enable three-dimensional molding after curing. Therefore, the crosslinking density of the composition after curing is low, and the abrasion resistance and the chemical resistance are poor.

The laminated films of Comparative Examples 2, 3, 5 and 6 have high luminous reflectance and are inferior in antireflection performance.

INDUSTRIAL APPLICABILITY

According to the present invention, it is possible to provide a laminated film that can be molded into a complicated shape. Therefore, this laminated film is preferably used particularly for manufacturing a protective material for a display.

This application claims priority based on Japanese Patent Application No. 2019-138313, which was filed in Japan on Jul. 26, 2019, the disclosure of which application is incorporated herein by reference in its entirety.

The invention claimed is:

1. A laminated film comprising:
   a transparent support substrate;
   an uncured hard coat layer formed on at least one surface of the transparent support substrate; and
   an uncured optical interference layer formed on the uncured hard coat layer, wherein
   the uncured hard coat layer comprises an active energy ray-curable composition for forming a hard coat layer,
   the uncured optical interference layer comprises an active energy ray-curable composition for forming an optical interference layer,
   a thickness of the transparent support substrate is 50 μm or more and 600 μm or less,
   a luminous reflectance including regular reflected light measured from an uncured optical interference layer side is 0.1% or more and 4.0% or less,
   a stretch ratio at 160° C. is 50% or more,
   the active energy ray-curable composition for forming the hard coat layer comprises a reactive acrylic resin and/or a non-reactive acrylic resin, and a polyfunctional urethane (meth)acrylate monomer and/or oligomer having an acrylate equivalent of 110 g/eq. or more and 180 g/eq. or less,
   a hardness measured from an uncured optical interference layer side by a nanoindentation method is 0.1 GPa or more and 0.5 GPa or less, and
   the laminated film is of an after-cure laminated film.

2. The laminated film according to claim 1, wherein the uncured optical interference layer has a thickness of 15 nm or more and 200 nm or less.

3. The laminated film according to claim 1, wherein the uncured hard coat layer has a thickness of 2 μm or more and 30 μm or less.

4. The laminated film according to claim 1, wherein a hardness measured by a nanoindentation method at the optical interference layer side of the laminated film irradiated with an active energy ray having an integral light quantity of 500 mJ/cm$^2$ is more than 0.5 GPa and 1.2 GPa or less.

5. The laminated film according to claim 1, wherein no scratches are visually recognized on the optical interference layer when the laminated film is irradiated with an active energy ray having an integral light quantity of 500 mJ/cm$^2$ and then a surface of the optical interference layer is rubbed 5000 times while a vertical load of 4.9 N is applied.

6. The laminated film according to claim 1, further comprising at least one uncured functional layer between the uncured hard coat layer and the uncured optical interference layer.

7. A laminated member comprising the cured laminated film according to claim 1.

8. The laminated film according to claim 1, wherein a content of the polyfunctional urethane (meth)acrylate monomer and/or oligomer is 5 parts by mass or more and 70 mass or less, per 100 parts by mass of a solid content of the active energy ray-curable composition for forming the hard coat layer.

9. The laminated film according to claim 1, wherein a content of the reactive acrylic resin and/or the non-reactive acrylic resin is more than 20 parts by mass and 60 parts by mass or less, per 100 parts by mass of a solid content of the active energy ray-curable composition for forming the hard coat layer.

10. The laminate film according to claim 1, which is used for three-dimensional shaping.

* * * * *